(12) United States Patent
Nakagawa et al.

(10) Patent No.: US 10,762,021 B2
(45) Date of Patent: Sep. 1, 2020

(54) INFORMATION PROCESSING SYSTEM, AND CONTROL METHOD OF INFORMATION PROCESSING SYSTEM

(71) Applicant: Hitachi, Ltd., Chiyoda-ku, Tokyo (JP)

(72) Inventors: Hirotaka Nakagawa, Tokyo (JP); Akira Deguchi, Tokyo (JP); Hiroshi Nasu, Tokyo (JP); Tomohiro Kawaguchi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 53 days.

(21) Appl. No.: 16/086,297

(22) PCT Filed: Jul. 11, 2016

(86) PCT No.: PCT/JP2016/070366
§ 371 (c)(1),
(2) Date: Sep. 18, 2018

(87) PCT Pub. No.: WO2018/011839
PCT Pub. Date: Jan. 18, 2018

(65) Prior Publication Data
US 2019/0108157 A1  Apr. 11, 2019

(51) Int. Cl.
*G06F 13/40* (2006.01)
*G06F 13/10* (2006.01)
(Continued)

(52) U.S. Cl.
CPC .......... *G06F 13/4031* (2013.01); *G06F 3/067* (2013.01); *G06F 3/0611* (2013.01);
(Continued)

(58) Field of Classification Search
CPC ............. G06F 11/3055; G06F 11/3027; G06F 13/4031; G06F 13/10; G06F 13/14;
(Continued)

(56) References Cited

U.S. PATENT DOCUMENTS

| 8,407,391 B2 * | 3/2013 | Uehara | ................ G06F 13/387 710/316 |
|---|---|---|---|
| 8,775,774 B2 | 7/2014 | Desai et al. | |

(Continued)

FOREIGN PATENT DOCUMENTS

| JP | 2012-531654 A | 12/2012 |
|---|---|---|
| WO | 2015/162634 A1 | 10/2015 |

(Continued)

*Primary Examiner* — Henry Tsai
*Assistant Examiner* — Christopher Daley
(74) *Attorney, Agent, or Firm* — Procopio, Cory, Hargreaves & Savitch LLP

(57) ABSTRACT

An information system connected to hosts and an information processing system manages a second ALU connected to the hosts via a second logical path, and second SLUs for receiving I/O requests from the hosts via the second logical path. A processor manages a first ALU connected to the hosts via a first logical path and first SLUs that receive I/O requests from the hosts via the first logical path, and builds up a first group including the first SLUs. A first SLU and a second SLU compose an HA pair, and the HA pair is provided to the hosts as one volume. The processor evaluates the state of the first logical path based on the pair state of the first SLU that composes the HA pair included in the first group so priorities with which the hosts issue I/Os to the first logical path can be determined.

10 Claims, 28 Drawing Sheets

(51) Int. Cl.
*G06F 13/14* (2006.01)
*G06F 3/06* (2006.01)
*G06F 11/30* (2006.01)

(52) U.S. Cl.
CPC .......... *G06F 3/0635* (2013.01); *G06F 3/0653* (2013.01); *G06F 3/0665* (2013.01); *G06F 11/3027* (2013.01); *G06F 11/3055* (2013.01); *G06F 13/10* (2013.01); *G06F 13/14* (2013.01)

(58) Field of Classification Search
CPC .... G06F 3/0653; G06F 3/0665; G06F 3/0635; G06F 3/067
See application file for complete search history.

(56) References Cited

U.S. PATENT DOCUMENTS

| | | | |
|---|---|---|---|
| 9,088,591 B2 * | 7/2015 | Vaghani | G06F 16/13 |
| 9,514,072 B1 * | 12/2016 | Candelaria | G06F 13/362 |
| 9,569,132 B2 * | 2/2017 | Sadhukhan | G06F 3/0635 |
| 10,191,685 B2 * | 1/2019 | Ishikawa | G06F 3/0619 |
| 2005/0188126 A1 * | 8/2005 | Mashima | G06F 3/0607 710/36 |
| 2006/0165002 A1 * | 7/2006 | Hicks | H04L 12/437 370/248 |
| 2007/0038748 A1 * | 2/2007 | Masuyama | G06F 3/0613 709/225 |
| 2007/0234113 A1 * | 10/2007 | Komatsu | G06F 11/201 714/6.13 |
| 2011/0179188 A1 | 7/2011 | Nakagawa et al. | |
| 2014/0101394 A1 * | 4/2014 | Johri | G06F 12/00 711/154 |
| 2014/0201438 A1 * | 7/2014 | Saito | G06F 3/0619 711/114 |
| 2016/0054946 A1 * | 2/2016 | Martinez Lerin | G06F 3/061 711/154 |
| 2016/0364287 A1 * | 12/2016 | Johri | G06F 3/0635 |

FOREIGN PATENT DOCUMENTS

| | | |
|---|---|---|
| WO | 2016/009504 A1 | 1/2016 |
| WO | 2016/103416 A1 | 6/2016 |

\* cited by examiner

FIG. 6

VM MANAGEMENT TBL.

| VM ID | VOL ID | VOL SIZE(GB) | PROFILE | STATUS |
|---|---|---|---|---|
| VM0001 | ST1.01:00(D) | 200GB | HA | POWER ON |
| | ST1.01:01(C) | 4GB | | |
| | ST1.01:02(S) | 40GB | | |

BOUND MANAGEMENT TBL.

T3000

| ALU ID | BOUND VOL ID |
|---|---|
| ST1.00:00 | ST1.01:00 |
| | ST1.01:01 |
| | ST1.01:02 |

LUN MANAGEMENT TBL.

T4000a

| PORT ID | PORT WWN | LUN | STATUS | LDWV ID |
|---------|----------|-----|--------|---------|
| CL1-A | wwn1 | lun1 | ACTIVE/OPTIMIZED | 00:00 |

T4010a  T4020a  T4030a  T4040a  T4050a

T4000b

| PORT ID | PORT WWN | LUN | STATUS | LDWV ID |
|---------|----------|-----|--------|---------|
| CL1-B | wwn2 | lun2 | STANDBY | 00:01 |

VOLUME MANAGEMENT TBL.

T5000a

| LDEV ID | ATTRIBUTES | CAPACITY (GB) | PAIR LDEV ID | PAIR STATUS |
|---|---|---|---|---|
| 00:00 | HA PVOL<br>ALU | 0 | ST2.00:01 | PAIR(MIRROR) |
| ... | NOT DEFINED | - | - | - |
| 01:01 | HA PVOL<br>SLU | 200 | ST2.10:01 | COPY(LOCAL) |
| 01:02 | HA PVOL<br>SLU | 4 | ST2.10:02 | PAIR(MIRROR) |
| 01:03 | HA PVOL<br>SLU | 40 | ST2.10:03 | PAIR(MIRROR) |
| ... | NOT DEFINED | - | - | - |
| FF:FF | NOT DEFINED | - | - | - |

VOLUME MANAGEMENT TBL.

T5000b

| LDEV ID | ATTRIBUTES | CAPACITY (GB) | PAIR LDEV ID | PAIR STATUS |
|---------|------------|---------------|--------------|-------------|
| 00:01 | HA PVOL / ALU | 0 | ST1.00:00 | PAIR(MIRROR) |
| ... | NOT DEFINED | - | - | - |
| 10:01 | HA PVOL / SLU | 200 | ST1.01:01 | COPY(BLOCK) |
| 10:02 | HA PVOL / SLU | 4 | ST1.01:02 | PAIR(MIRROR) |
| 10:03 | HA PVOL / SLU | 40 | ST1.01:03 | PAIR(MIRROR) |
| ... | NOT DEFINED | - | - | - |
| FF:FF | NOT DEFINED | - | - | - |

CONSISTENCY GROUP MANAGEMENT TBL.

T6000a

| CTG ID | LDEV ID | PAIR CTG ID | STATUS | VM ID |
|---|---|---|---|---|
| CTG001 | 01:01 | ST2.CTG010 | COPY (LOCAL) | VM001 |
| | 01:02 | | | |
| | 01:03 | | | |

T6010a  T6020a  T6030a  T6040a  T6050a

T6000b

| CTG ID | LDEV ID | PAIR CTG ID | STATUS | VM ID |
|---|---|---|---|---|
| CTG010 | 10:01 | ST1.CTG001 | COPY (BLOCK) | VM001 |
| | 10:02 | | | |
| | 10:03 | | | |

BOUND MANAGEMENT BITMAP

T7000a

| ALU ID | BITMAP |
|---|---|
| 00:00 | 00:00  01:01    FF:FF<br>↓    ↓       ↓<br>0000...111...000<br>65536bit |

T7010a   T7020a

T7000b

| ALU ID | BITMAP |
|---|---|
| 00:01 | 00:00  10:10    FF:FF<br>↓    ↓       ↓<br>0000...111...000<br>65536bit |

CONSISTENCY GROUP MANAGEMENT TBL.

T8000a

| CTG ID | LDEV ID | PAIR CTG ID | STATUS | AG ID |
|---|---|---|---|---|
| CTG001 | 00:00 | ST2.CTG010 | COPY (LOCAL) | AG001 |
| | 01:01 | | | |
| | 01:02 | | | |
| | 01:03 | | | |

T8010a T8020a T8030a T8040a T8050a

T8000b

| CTG ID | LDEV ID | PAIR CTG ID | STATUS | AG ID |
|---|---|---|---|---|
| CTG010 | 00:01 | ST1.CTG001 | COPY (BLOCK) | AG001 |
| | 10:01 | | | |
| | 10:02 | | | |
| | 10:03 | | | |

N-PORT MANAGEMENT TBL.

T9000A

| PORT WWN | VPORT WWN | VM ID | AG ID |
|----------|-----------|-------|-------|
| wwn1 | V-wwn1 | VM001 | AG001 |
|      | V-wwn2 | VM002 | AG002 |

T9010A   T9020A   T9030A   T9040A

T9000B

| PORT WWN | VPORT WWN | VM ID | AG ID |
|----------|-----------|-------|-------|
| wwn2 | V-wwn3 | – | – |
|      | V-wwn4 | VM003 | AG002 |

HOST GROUP MANAGEMENT TBL.

U1000a

| PORT ID | PORT WWN | HG | INITIATOR WWN | AG ID | LUN | LDEV ID |
|---|---|---|---|---|---|---|
| CL1-A | wwn1 | HG1 | V-wwn1 | AG001 | LUN0 | 00:00 |
| | | HG2 | V-wwn2 | AG002 | LUN1 | 00:00 |
| | | | V-wwn3 | | | |

U1010A  U1020A  U1030A  U1040A  U1050A  U1060A  U1070A

U1000B

| PORT ID | PORT WWN | HG | INITIATOR WWN | AG ID | LUN | LDEV ID |
|---|---|---|---|---|---|---|
| CL1-B | wwn2 | HG3 | V-wwn1 | AG001 | LUN2 | 00:01 |
| | | HG4 | V-wwn2 | AG002 | LUN3 | 00:01 |
| | | | V-wwn3 | | | |

U1010B  U1020B  U1030B  U1040B  U1050B  U1060B  U1070B

INFORMATION PROCESSING SYSTEM, AND CONTROL METHOD OF INFORMATION PROCESSING SYSTEM

CROSS-REFERENCE TO RELATED APPLICATIONS

This application is a U.S. National Stage entry of PCT Application No: PCT/JP2016/070366 filed Jul. 11, 2016, the contents of which are incorporated herein by reference.

TECHNICAL FIELD

The present invention relates to an information processing system, and a control method of the information processing system.

BACKGROUND ART

Conventionally, due to the development of a virtualization technology, plural virtual servers have been built on one physical host computer, a configuration in which the images of the virtual servers and usage data are stored in a storage device has been widely spread, and further data of one or more virtual servers has been concentrated on one logical volume of the storage device. However, in this data concentration configuration, when the local copy function and remote copy function of the storage device are used, a copy unit is composed of plural virtual servers, so that virtual servers that are not target virtual servers and included in the copy unit become wasteful costs.

To cope with the above problem, Patent Literature 1 proposes Conglomerate LUN Structure, in which plural logical volumes of a storage device are held together into plural logical groups (LUN Conglomerate), a logical path is set in a representative logical volume (ALU: Administrative Logical Unit, PE (Protocol End Point) in Patent Literature 1) of each logical group; an I/O (Input/Output) command issued from a host computer includes an identifier of a logical volume (SLU: Subsidiary Logical Unit, vvol (virtual volume) in Patent Literature 1) other than the ALU to which the logical path belongs in each logical group; and the storage device delivers the relevant I/O processing to the SLU specified by the reception command. With the use of the above structure, one or more SLUs are assigned to one virtual server on the host computer, so that it becomes possible to assign an appropriate number of logical volumes of the storage device to each virtual server.

In addition, Patent Literature 2 discloses a technology in which a control device that controls the logical resources of a storage system includes: a virtual resource preparation unit that prepares virtual resources that are virtual logical resources; a real resource assignment unit that assigns real resources, which are substantial logical resources, to the above-described prepared virtual resources; and a data duplication control unit that duplicates data in a logical volume as duplicate data in a logical volume in a different storage system. Furthermore, in this technology, the identification of the virtual resource of the duplication source logical volume and that of the duplication destination logical volume are set the same, so that a higher-level host computer recognizes the two logical volumes as one logical volume. Therefore, Patent Literature 2 also discloses in this technology that the control device that controls the logical resources of a storage system makes an I/O command transmitted from the host computer to a logical volume in the storage system transferred to a logical volume in another storage systems.

CITATION LIST

Patent Literature

Patent Literature 1: U.S. Pat. No. 8,775,774
Patent Literature 2: WO 2015/162634

SUMMARY OF INVENTION

Technical Problem

In order to enhance the availabilities of logical volumes assigned to a virtual server, a storage cluster configuration in which the logical volumes assigned to the virtual server are reduplicated in different storage devices can be built according to Patent Literature 2. According to Patent Literature 2, if one storage device is in the state of copying formation or in a suspended state, an I/O transfer is executed to another storage device that is in a normal state in the storage cluster configuration. However, because this I/O transfer is executed via a network between the two storage devices, this I/O transfer needs a larger delay time than a normal I/O transfer.

According to Patent Literature 1, in the case where a virtual server uses plural logical volumes, because a logical path control unit included in the host computer uses the logical path to the relevant ALU, if there mixedly exist plural SLUs that have various response delays, this causes the processing delay or stoppage of the virtual server or the processing delays or stoppages of an OS and applications on the virtual server.

Therefore, the object of the present invention is to provide an information system in which the delay or stoppage of processing performed by a computer, which uses logical volumes, can be suppressed.

Solution to Problem

An information processing system is connected to one or plural hosts and a second information processing system, and includes a processor. The second information processing system manages a second ALU connected to the one or plural hosts via a second logical path, and plural second SLUs that receive I/O requests from the one or plural hosts via the second logical path.

The processor manages a first ALU connected to the one or plural hosts via a first logical path and plural first SLUs that receive I/O requests from the one or plurality of hosts via the first logical path, and builds up a first group including the plural first SLUs.

At least one first SLU of the plural of first SLUs and at least one second SLU of the plural second SLUs compose an HA pair, and the HA pair is provided to the one or plural hosts as one volume.

The processor evaluates the state of the first logical path on the basis of the pair state of the first SLU that composes the HA pair included in the first group so that priorities with which the one or plural hosts issue I/Os to the first logical path can be determined.

Advantageous Effects of Invention

According to the above-mentioned technology, I/Os can consistently be issued to logical paths without the occurrences of I/O delays and retries in virtual servers, an OS, or the applications on a host computer, so that the delays or stoppages of pieces of processing performed on the computer using the logical volumes of storage devices can be suppressed.

BRIEF DESCRIPTION OF DRAWINGS

FIG. 6 is a diagram showing an example of a configuration of a virtual server management table included in the host computer.

FIG. 8 is a diagram showing an example of a configuration of a bound management table included in the host computer.

FIG. 9 is a diagram showing examples of configurations of LUN management tables included in the storage device.

FIG. 10 is a diagram showing an example of a configuration of a logical volume management table included in the storage device.

FIG. 11 is a diagram showing an example of a configuration of a logical volume management table included in the storage device.

FIG. 12 is a diagram showing examples of configurations of consistency group management tables included in the storage device.

FIG. 13 is a diagram showing examples of configurations of bound management tables included in the storage device.

FIG. 21 is a diagram showing examples of configurations of consistency group management tables included in a storage device.

FIG. 24 is a diagram showing examples of configurations of virtual port management tables included in a host computer.

FIG. 25 is a diagram showing examples of configurations of host group management tables included in a storage device.

DESCRIPTION OF EMBODIMENTS

Figure 1:
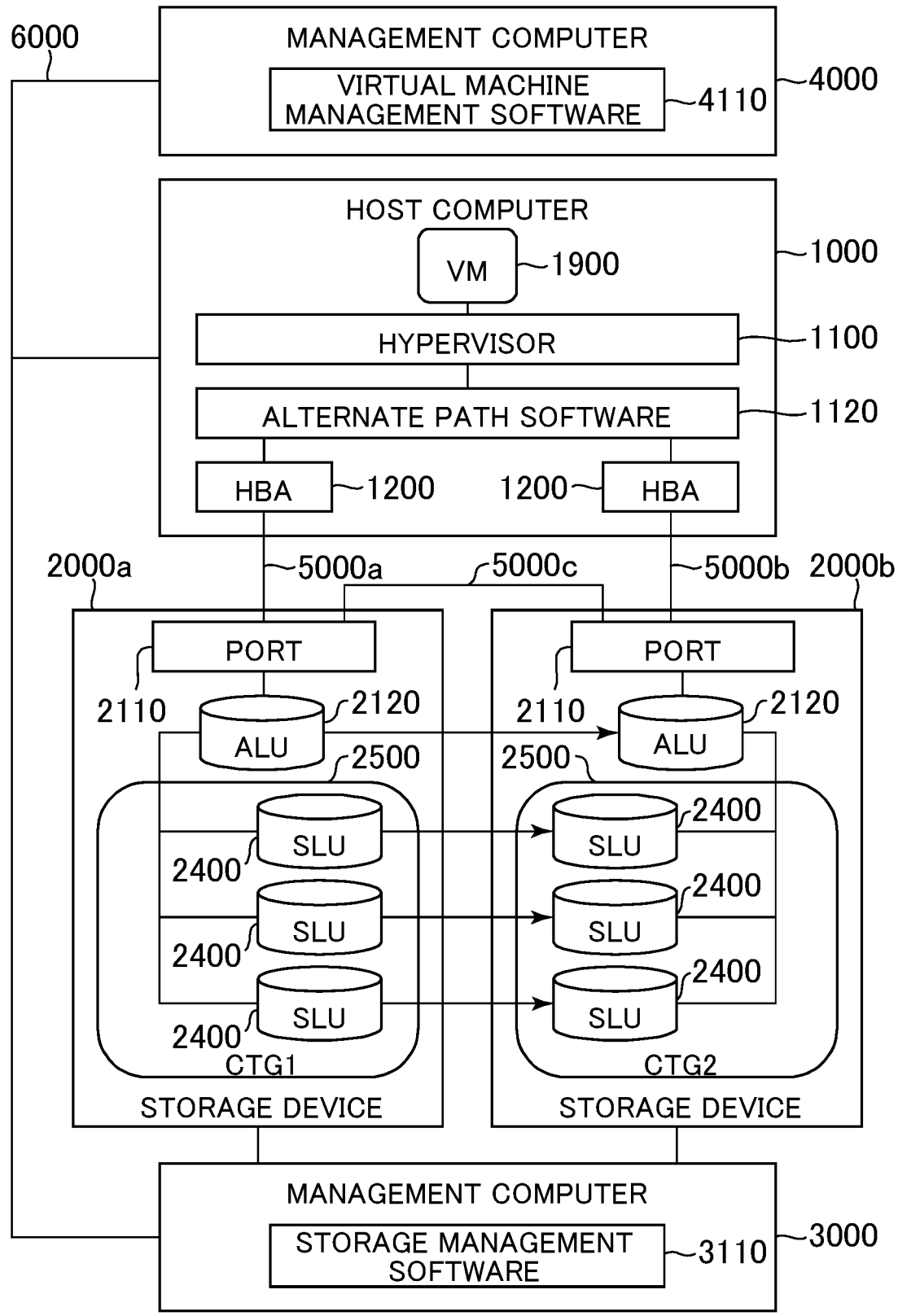
FIG. 1 is a diagram showing an example of a configuration of a storage system.

Hereinafter, embodiments will be explained with reference to the accompanying drawings.

In the following descriptions, although various pieces of information about respective embodiments will be explained in the forms of "tables", it is not always necessary for those pieces of information to be expressed in the forms of tables, and it is also conceivable that those pieces of information are represented in data structures other than in the forms of tables. Furthermore, although there are some cases where "programs" are used as subjects in descriptions, these programs are executed by a processor so that predefined pieces of processing are performed using memories and communication ports, therefore it is conceivable that the processor is a subject in the descriptions instead of the programs.

In addition, the pieces of processing performed through the processor's executing the programs are substantially equal to pieces of processing performed by dedicated hardware, there for part of the pieces of processing or all the pieces of processing can be realized by the dedicated hardware. Therefore, although there are several things each of which is represented by "*unit" in this specification, part of this "*unit" or the entirety of this "*unit" can be realized through a processor's executing a program, or part of this "*unit" or the entirety of this "***unit" can be realized by dedicated hardware.

Furthermore, the programs can be installed from a program delivery server or from a storage medium that is computer-readable.

In addition, in the following descriptions, things that are lacking the last alphabets represent generic terms of the things.

First Embodiment

In this embodiment, disclosed is a storage system in which logical volumes in a storage device, which are dealt with by one or plural virtual servers (hereinafter, referred to as VM (Virtual Machines)) on a host computer, are held together into one logical group in the logical volume (hereinafter, also referred to SLUs) assignment configuration, which is proposed by Conglomerate LUN Structure disclosed in Patent Literature 1) and in the storage cluster disclosed in Patent Literature 2, logical paths to ALUs are evaluated for respective logical groups, and a logical path to which an I/O is issued is selected on the basis of the evaluation result.

In order to enhance the availabilities of logical volumes assigned to a virtual server, a storage cluster configuration in which the logical volumes assigned to the virtual server are reduplicated in different storage devices can be built according to Patent Literature 2. Furthermore, according to Patent Literature 1, one or plural logical volumes can be assigned per virtual server. According to Patent Literature 2, if one storage device to be assigned to a storage server is in the state of copying formation or in a suspended state, an I/O transfer is executed to another storage device that is in a normal state in the storage cluster configuration. However, because this I/O transfer is executed via a network between the two storage devices, this I/O transfer needs a larger delay time than a normal I/O transfer, therefore, in the case where a virtual server uses plural logical volumes, because logical volumes that use I/O transfers and logical volumes that do not use I/O transfers mixedly exist, which leads to the processing delay or stoppage of the virtual server or the processing delays or stoppages of the OS and applications on the virtual server.

In addition, because a logical path control unit included in a host computer targets logical paths to ALUs, when plural virtual servers have an ALU in common, if an I/O issuance to a logical volume of a virtual server is delayed due to its I/O transfer, or the retry of the I/O issuance is needed, the logical path to the ALU is projected to be abnormal. Therefore, the logical path control unit of the host computer regards the logical path to the ALU as abnormal, and degrades or suppresses the priority of the I/O issuance, so that, even if the logical volumes of other severs that have the ALU in common are in a normal state, I/Os to the logical volumes cannot be issued, which leads to the stoppage of the other virtual servers.

According to this embodiment, I/Os can consistently be issued to logical paths without the occurrences of I/O delays and retries in virtual servers, an OS, or applications on a host computer, so that the delays or stoppages of pieces of processing performed on the computer using the logical volumes of storage devices are suppressed.

FIG. 1 is a diagram showing an example of a configuration of the storage system according to the first embodiment. A host computer 1000 includes HBAs (Host Bus Adapters) 1200 that are connection I/Fs between the hypervisor 1110, which expands a virtual machine, and SANs 5000, and an alternate path software 1120 that deals with Raw Devices (not shown) obtained from the HBAs 1200. Data dealt with by a VM expanded by the hypervisor 1110 is stored in logical volumes 2500 to which SLU attributes of storage devices 2000 are given (hereinafter, referred to as SLUs); Conglomerate LUN Structure is applied to access to an SLU 2400, and an HBA 1200 recognizes an ALU via the SAN 5000 and creates a RAW Device (not shown); the alternate path software performs logical path control per RAW DEVICE; and the hypervisor includes a data input/output unit conforming to Conglomerate LUN Structure; recognizes the SLU assigned to the RAW DEVICE, that is to say, to the ALU (hereinafter, this assignment will be referred to as binding), and assigns the SLU to the virtual machine as a virtual disk. This binding processing of the SLU is performed for VM image writing at the time of VM creation, and every time the power-on of a VM is executed. The release of the assignment of the SLU to the ALU (hereinafter, referred to as unbinding) is executed at the time of the completion of VM creation, or every time the power-off of a VM is executed.

A storage device 2000 includes: a logic division unit that classifies logical volumes into plural logical partitions (hereinafter, referred to CTGs: Consistency Groups 2500); an I/O control unit (data input/output control unit) that is conforming to Conglomerate LUN Structure and transfers an I/O corresponding to a logical volume to another storage device; and a data duplication control unit that duplicates data, which is stored in a logical volume, in a logical volume in another storage device 2000 via a SAN (Storage Area Network) 5000. A logical volume is provided to the host computer 1000 from a logical port 2110 via SAN 5000a or SAN 5000b.

By transferring an I/O regarding a logical volume to a storage device 2000 that is connected via SAN 5000c or duplicating the I/O in the storage device 2000, data stored in the logical volume is reduplicated both in storage device 2000a and in storage device 2000b. Furthermore, a kind of storage cluster system disclosed in Patent Literature 1 is formed in such a way that, by giving the same virtual resource identifiers to logical volumes that compose a pair, plural logical paths on SAN 5000a and SAN 5000b to the logical volumes that compose a pair are recognized by the host computer 1000 as if these logical paths were an alternate path to one logical volume.

As mentioned above, this characteristic that data is reduplicated in plural logical volumes, and plural logical paths to the logical volumes that compose a pair are recognized by the host computer 1000 as if these logical paths were an alternate path to one logical volume is referred to as HA (High Availability). The storage device 2000 can receive an I/O issued to any of volumes composing a pair having an HA characteristic (referred to as an HA pair) by the host computer 1000. In addition, even if one logical volumes composing a pair, that is to say, one of logical volumes having an HA characteristic becomes inaccessible due to some kind of failure, I/Os issued from the host computer 1000 can be continuously accepted by another volume.

Here, as a function of the logic division unit, even if data is duplicated among plural logical volumes belonging to the same CTG 2500, the consistency among the data can be assured. In other words, even if pairing operation is executed between logical volumes 2400a belonging to CTG1 2500a and logical volumes 2400b belonging to CTG2 2500b, the consistency of data among logic volumes in the same CTG 2500 is retained.

The storage devices 2000a and 2000b provide various configuration management tables included in the storage devices 2000 and management APIs (Application Program Interfaces) provided by configuration control units to a management computer 3000 that is connected to the storage devices 2000a and 2000b via a management network 6000 typified by a LAN (Local Area Network). The management computer 3000 provides the various management tables of the storage devices 2000 included in the management computer 3000 and the management APIs provided by the configuration control units to the host computer 1000 and a management computer 4000 that are connected to the management computer 3000 via the management network 6000.

Furthermore, a storage manager (not shown) accesses storage management software 3110 via an input/output unit included in the management computer 3000, and executes the creation, deletion, and configuration change of storage resources such as ALUs, and a virtual machine manager accesses virtual machine management software 4110 via an input/output unit included in the management computer 4000, and executes the creation, deletion, and configuration change of virtual machines. The virtual machine management software 4110 transmits a virtual machine management operation instruction to the host computer 1000 connected to the management network 6000 in accordance with an instruction issued by the virtual machine manager, and transmits instructions regarding the creation, deletion, and configuration change of a logical volume to the storage management software 3110 included in the management computer 3000.

In addition, the storage devices 2000a and 2000b include logical path evaluation units that evaluate the appropriateness of I/O processing per LUN, and define the state in which I/O processing can be performed as "STANDBY", the state in which I/O processing can be optimally performed as "ACTIVE/OPTIMIZED", and the state in which I/O processing can be performed but there is a possibility of the retry of the I/O processing being requested as "ACTIVE/NON-OPTIMIZED". The storage devices 2000a and 2000b respond to logical path evaluation value notification requests that are issued from the alternate path software 1120 on the host computer 1000 via the SANs 5000, and the alternate path software 1120, which have received the responses, issue I/Os preferentially to logical paths evaluated as "ACTIVE/OPTIMIZED" on the basis of the response values.

Hereinafter, the logical path control that evaluates logical paths on the basis of the states of pairs of bound SLUs or the states of pieces of I/O processing in the logical path evaluation units included in the storage devices 2000a and 2000b will be explained. First, the configuration of each of the storage devices 2000a and 2000b will be explained.

Here, the storage device 2000 is an example of an information processing system such as a storage system, and therefore the present invention is not limited to configurations shown by the accompanying drawings. A storage system according to the present invention can be a storage system based on software installed on a server. Alternatively, the storage system according to the present invention can be a storage system realized by software installed on a virtual machine running on a cloud.

Figure 2:
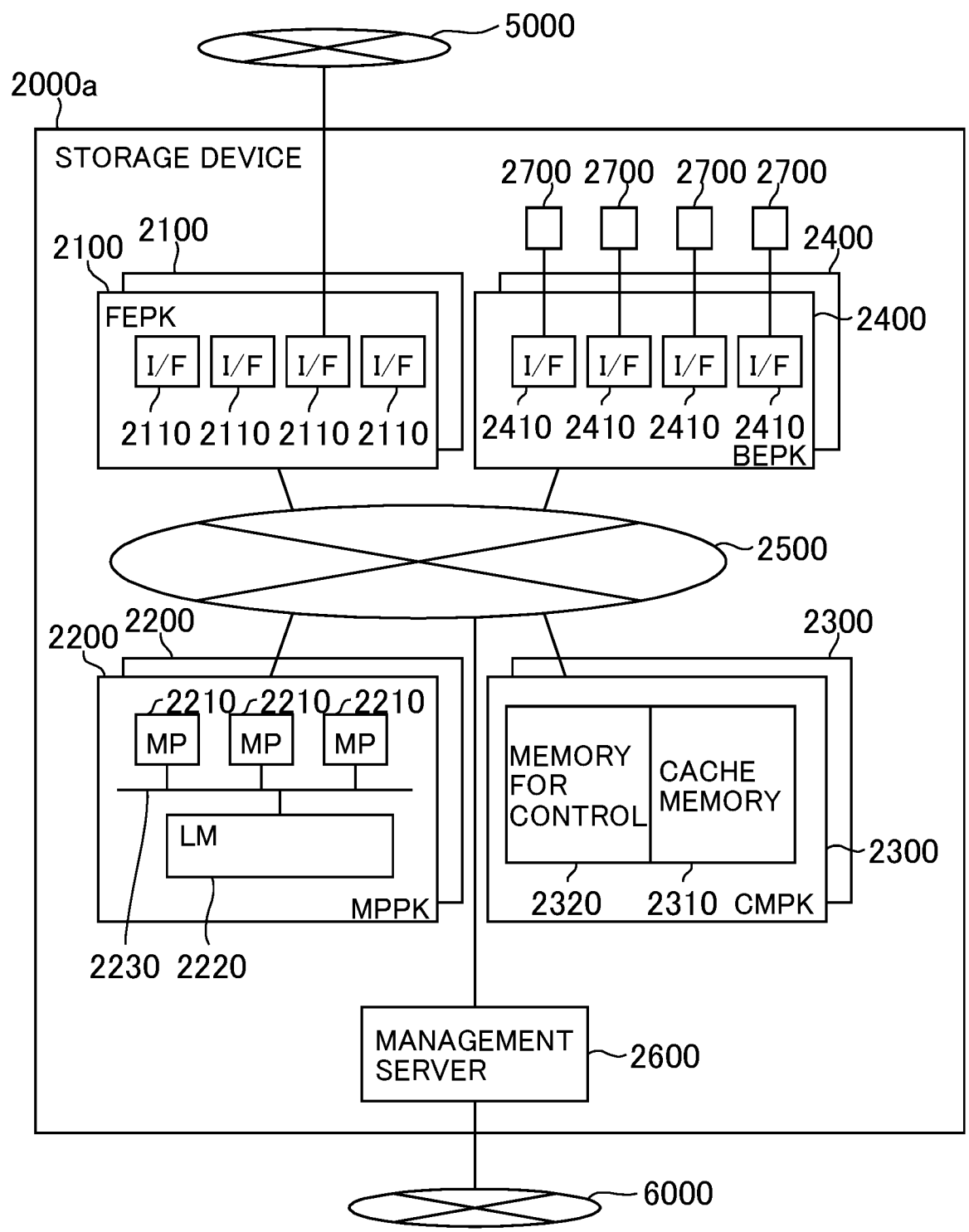
FIG. 2 is a diagram showing an example of a configuration of a storage device.

FIG. 2 shows the configuration of the storage device 2000. The storage device 2000 includes: at least one FEPK (Front End Package) 2100 that is a host I/F unit; at least one MPPK (Microprocessor Package) 2200 that is a control unit; at least one CMPK (Cache Memory Package) 2300 that is a common memory unit; at least one BEPK (Backend Package) 2400 that is a disk I/F unit; an internal network 2500; at least one HDD (Hard Disk Drive) 2700; and a management server 2600. Here, instead of the at least one HDD 2700, at least one another storage device such as at least one SSD (Solid State Drive) can be used.

The internal network 2500 connects the at least one FEPK 2100, the at least one MPPK 2200, the at least one CMPK 2300, the at least one BEPK 2400, and the management server 2600 to one another. Respective MPs 2210 in the at least one MPPK 2200 are configured to be able to communicate with the at least one FEPK 2100, the at least one CMPK 2300, and the at least one BEPK 2400 using the internal network 2500.

The at least one FEPK 2100 includes plural logical ports 2110 each of which can be a host I/F. A logical port 2110 is connected to an external network 5000 such as the SAN 5000, and performs protocol control when an I/O request issued by the host computer 1000 and read/write target data are transmitted or received between the logical port 2110 and the host computer 1000. The at least one BEPK 2400 includes plural disk I/Fs 2410. A disk I/F 2410 is connected to the at least one HDD 2700 via, for example, a cable, and at the same time the disk I/F 2410 is connected to the internal network 2500, so that the disk I/F 2410 plays a role of a mediator for the transmission/reception processing of read/write target data between the internal network 2500 and the at least one HDD 2700.

The at least one CMPK 2300 includes a cache memory 2310 for data and a memory 2320 for control information. The cache memory 2310 and the memory 2320 for control can be volatile memories, for example, DRAMs (Dynamic Random Access Memories). The cache memory 2310 temporarily stores (caches) data to be written in the at least one HDD 2700, or temporarily stores (caches) data read from the at least one HDD 2700. The memory 2320 for control information stores information necessary for control, for example, configuration information for ALUs 2120, SLUs 2400, CTGs 2500, and the like that are logical volumes.

The at least one MPPK 2200 includes plural MPs (Micro Processors) 2210, an LM (Local Memory) 2220 and a bus 2230 that connects the plural MPs 2210 and the LM 2220. An MP 2210 is a processor used for a computer or the like, and plays a role of a logic division unit, an I/O control unit, a configuration control unit, or the like when the MP 2210 operates in accordance with programs stored in the LM 2220. The LM 2220 stores part of control information for I/O control that is stored in the memory 2320 for control. The management server 2600 is a computer including management applications. The management server transmits an operation request from the management computer 3000 to a control program that has been loaded from the memory 2320 for control to the LM 2220 and executed by MP 2210. The management server 2600 can also include various programs included in the management computer 3000.

The memory 2320 for control stores information that logic division units and I/O control units deal with. The storage device management program 3110 in the management computer 3000 can obtain information stored in the memory 2320 for control via the management server 2500.

A logic division unit distributes logical volumes (also referred to as LDEVs: Logical Devices) that are provided by the at least one BEPK 2400 and that are used as logical storage areas among the CTGs 2500, and gives an identifier, which is uniquely identified in each CTG 2500, to the configuration information of a logical volume 2210 registered in each CTG 2500, and stores the configuration information in the memory 2320 for control as a CTG management table T6000.

Figure 3:
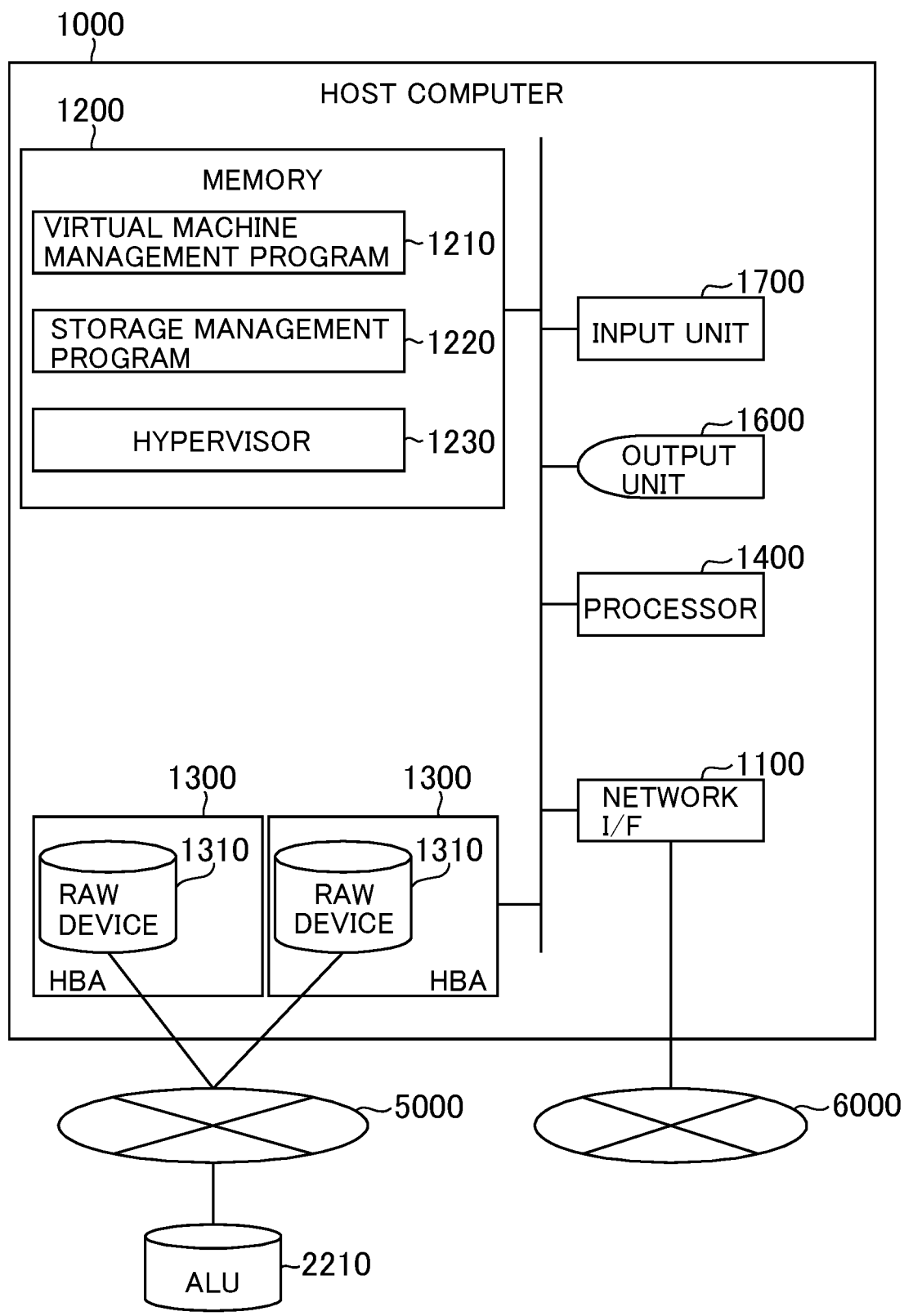
FIG. 3 is a diagram showing an example of a configuration of a host computer.

FIG. 3 shows the configuration of the host computer 1000. The host computer 1000 is a computer including: a processor 1400; a memory 1200; HBAs (Host Bus Adapters) 1300; an output unit 1600; an input unit 1700; a management port 1100 that is a network I/F; and the like, and the host computer is, for example, a personal computer, a workstation, a mainframe, or the like.

The processor 1400 integratedly controls the entirety of the host computer 1000, and executes a virtual machine management program 1210, a storage management program 1220, a hypervisor 1230, and the program of alternate path software that are stored in the memory 1200. For example, the processor 1100 issues a read access request or write access request to the storage device 2000 as an access request by executing the hypervisor 1230. The memory 1200, the virtual machine management program 1210, the storage management program 1220, and the hypervisor 1230. The memory 1200 is not only used for storing such programs and the like, but also used as a working memory for the processor 1400.

Furthermore, the storage management program 1220 can transmit operation requests toward the logical volumes 2210 such as SLU assignment or the release of SLU assignment issued from a job application 1210 or an OS to the storage device management program 3110 included in the management computer 3000 via the management network 6000. In addition, the storage management program 1220 can transmit the operation request of a logical volume to a configuration control unit included in the storage device 2000 via the SAN 5000.

An HBA 1300 performs protocol control at the time of communicating with the storage device 2000. Because the HBA 1300 performs the protocol control, the transmission and reception of data and commands between the host computer 1000 and the storage device 2000 are performed in accordance with, for example, the fiber channel protocol.

The input unit 1700 includes, for example, a keyboard, a switch, pointing device, a microphone, and the like, and the like. The output unit 1600 includes a monitor display, a speaker, and the like.

Figure 4:
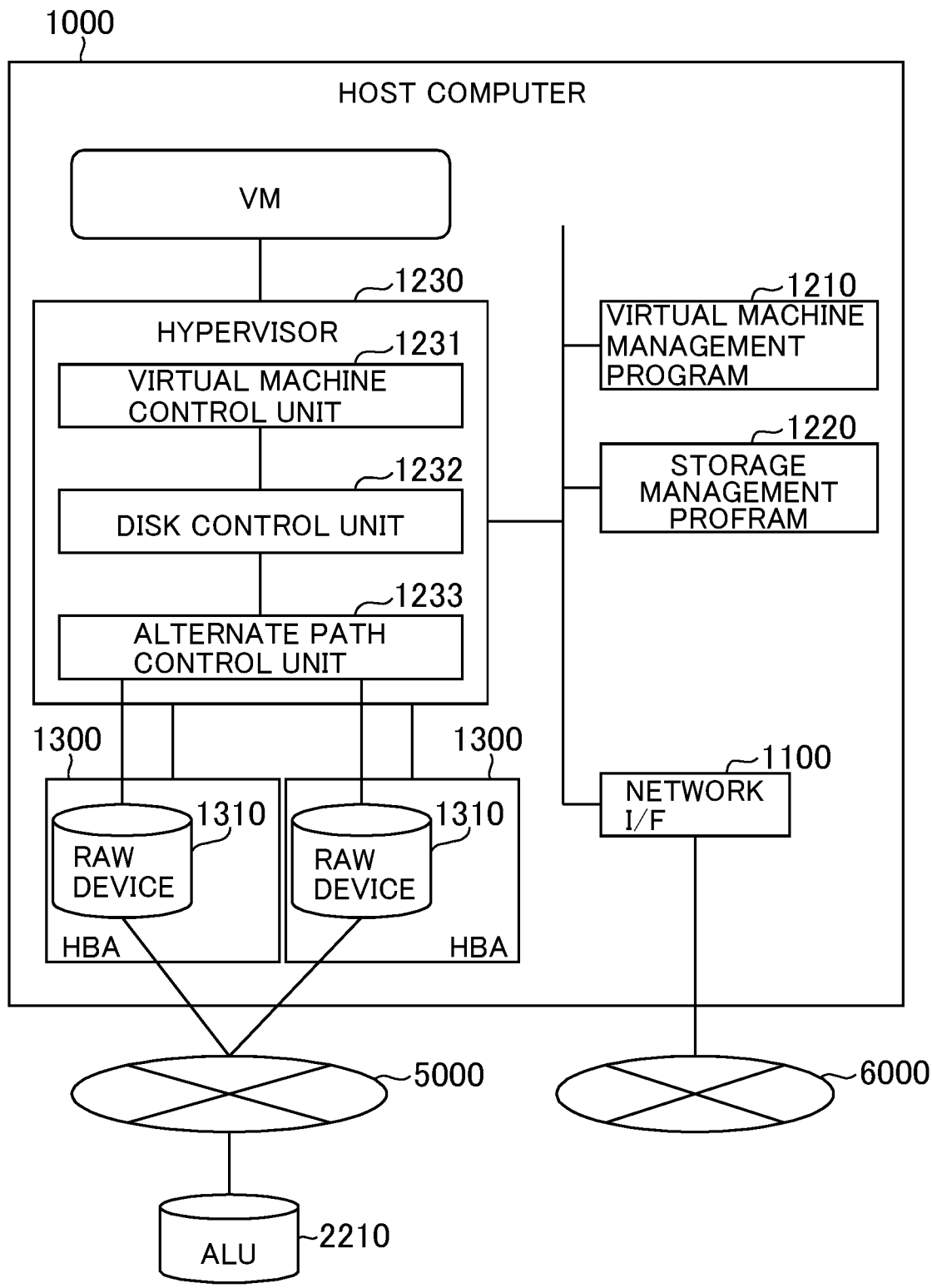
FIG. 4 is a diagram showing an example of a configuration of a control unit and software included in the host computer.

FIG. 4 shows the logical block diagram of the host computer 1000. The hypervisor 1230 includes: a virtual machine control unit 1231 that expands the virtual machine; a disk control unit 1232 that forms virtual disks from SLUs obtained from RAW DEVICEs; and an alternate path control unit 1233 that controls logical paths through which the logical volumes of the storage device 2000 are accessed. Here, instead of the alternate path control unit 1233, the logical buses can be controlled by the alternate path software 1120 other than the hypervisor as shown in FIG. 1. Hereinafter, "the alternate path control unit 1233" can be replaced with "the alternate path software 1120, and vice versa.

The RAW DEVICES 1310 correspond to the ALUs 2120 in the storage devices 2000, and they are devices that can be replaced with accesses to the ALUs 2120 in the host computer 1000. The alternate path control unit 1233 controls logical paths extended to the RAW DEVICEs 1310. The disk control unit 1232 forms one virtual disk corresponding to one SLU 2400 of a storage device 2000 that is accessible via a RAW DEVICE 1310. Accesses to SLUs 2400 in the host computer 1000 are concentrated on the RAW DEVICEs 1310. In other words, an access to an SLU 2400 is executed after the alternate path control unit 1233 specifies the target SLU 2400 via a RAW DEVICE associated with the target SLU 2400. The RAW DEVICEs 1310 are used as devices that reduce overhead by executing I/O processing without temporarily copying data in a page cache (not shown) when a Hyper Visor unit 1400 is accessed.

The volume identifier of the target SLU that an HBA 1300 obtains has to be globally unique, and the volume identifier is formed as a combination of the serial number (product number) of the relevant storage device 2000 and the local volume identifier of the target SLU in the storage device 2000. In this embodiment, the storage device 2000 has a function of sending back the identifier of the relevant ALU in response to the response of the volume identifier.

Figure 5:
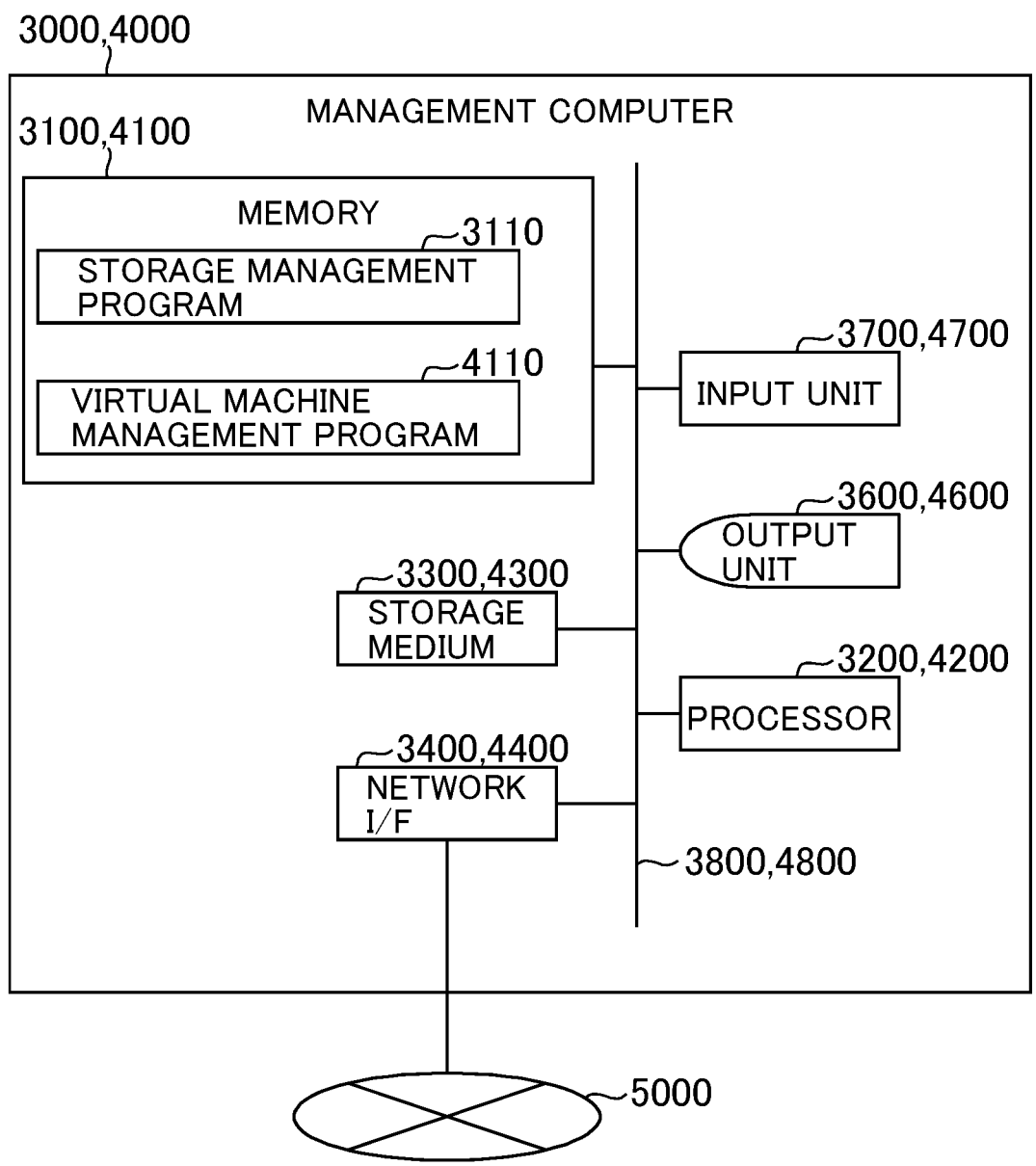
FIG. 5 is a diagram showing an example of a configuration of a management computer.

FIG. 5 shows the configuration of the management computer. In the management computer 3000, a processor 3600 integratedly controls the entirety of the management computer 3000, and transmits various configuration management operation requests regarding the storage devices 2000 and the host computer 1000 to the storage devices 2000 and the host computer 1000 via a network I/F 3400 and the management network 6000 by executing the storage device management program 3110 and a computer management program (not shown) that are loaded in a memory 3100.

Furthermore, the memory 3100 also stores control information that is used by the storage device management program 3110 and the host computer management. The storage manager inputs an operation request into an input unit 3700 using a keyboard or a mouse, and can obtain an execution result via an output unit 3600 such as a display or a speaker. A storage medium 3300 such as an HDD or an SSD stores the execution logs of the storage device management program 3110, the host computer management program 3120, and various control programs.

The configuration of the management computer 4000 is similar to that of the management computer 3000 shown in FIG. 5, a virtual machine management program 4110 is loaded in a memory 4100, and the management computer 4000 transmits the configuration management operation requests regarding a virtual machine 1900 and the storage devices 2000 to the storage devices 2000 and the host computer 1000 via the management network 6000.

FIG. 6 is a diagram showing an example of a configuration of a VM management table T1000 included in the host computer 1000. The VM management table T1000 is referred to when the host computer 1000 executes the hypervisor 1230 and the virtual machine management program 1210, and can be accessed from various programs included in the management computers 3000 and 4000 via the management network 6000 using an API provided by the host computer 1000.

The VM management table T1000 includes: the column VM ID T1010 that registers the identifier of the VM 1900 identifiable in the storage system; the column VOL ID T1020 that registers the identifiers of SLUs 2400 assigned to the VM 1900; the column VOL SIZE T2030 that registers the capacities of the relevant SLUs 2400; the column PROFILE T1040 that registers a profile regarding the VM 1900; and the column STATUS T1050 that registers the status of the VM 1900.

Here, a profile regarding a VM means the characteristic information of the VM that is specified by a VM administrator when the VM is created. The characteristic information of the VM can be defined on the virtual machine management software included in the management computer 4000, and the VM administrator can select one or more pieces of characteristic information from the predefined characteristic information when the VM is created. In this embodiment, HA (High Availability) showing being highly available is specified as an example of the characteristic of the VM. If HA is specified, the SLUs 2400 assigned to the VM 1900 become pair of logical volumes having a HA characteristic.

Figure 7:
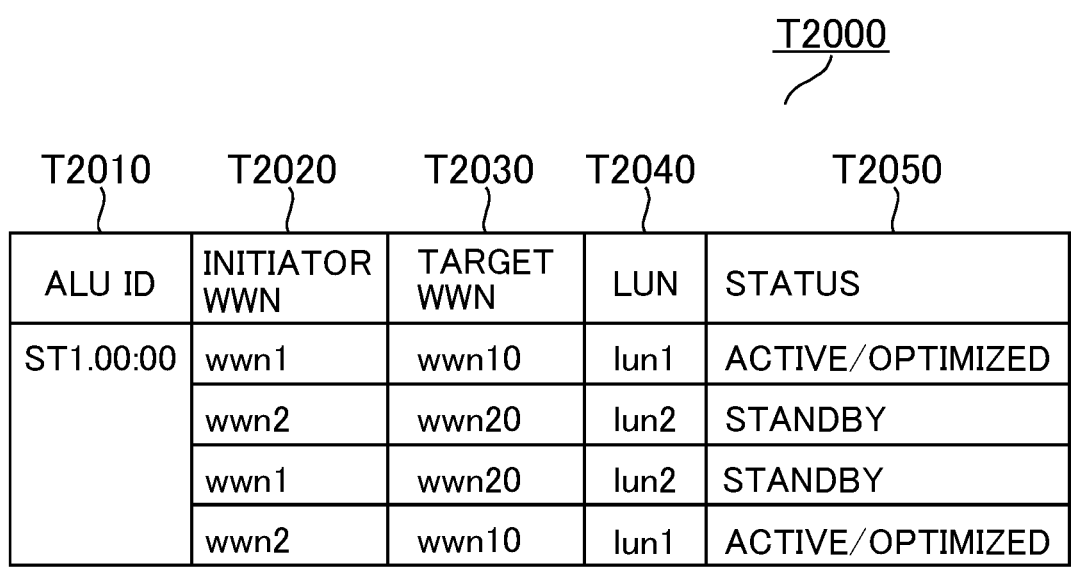
FIG. 7 is a diagram showing an example of a configuration of a logical path management table included in the host computer.

FIG. 7 is a diagram showing an example of a configuration of a logical path management table T2000 included in the host computer 1000. The logical path management table T2000 is referred to when processing is performed by the alternate path software 1120 on the host computer 1000, the alternate path control unit 1231 included in the hypervisor 1230, or the storage management program 1220. The logical path management table T2000 can be accessed from various programs included in the management computers 3000 and 4000 via the management network 6000 using the API provided by the host computer 1000.

The logical path management table T2000 includes: the column ALU ID T2010 that registers the identifier of an ALU 2120 that composes a RAW DEVICE 1310 obtained from an HBA 1300; the column INITIATOR WWN T2020 that registers the WWNs (World Wide Names) of HBAs 1300 that recognize the ALU 2120; the column TARGET WWN T2030 that registers the WWNs of logical ports 2110 in the relevant storage device 2000 where the ALU 2120 can be obtained from the relevant HBA 1300; the column LUN T2040 that registers LUNs (Logical Unit Numbers) that are the TARGET WWNs and belong to the ALU 2120 registered in the column T2010 are registered; and the column STATUS T2050 in which the statuses of the LUNs are registered. After the alternate path software 1120 or the alternate path control unit 1231 and the storage management program 1220 issue an LUN scanning request (REPORT LUN) to each HBA 1300, and each HBA 1300 transmits the list of LUNs that each HBA recognizes in response to the request, the logical path management table T2000 is updated on the basis of the response values. In addition, after the alternate path software 1120 or the alternate path control unit 1231 requests each HBA 1300 to obtain the status of each LUN registered in the column T2040, STATUS T2050 registers the response value in the relevant column. For example, a value in the column STATUS T4040 of the after-mentioned LUN management table T4000 that registers the status of a LUN is obtained by the alternate path control unit 1231, and the obtained value is stored in the column STATUS T2050 for registering the status of the LUN.

FIG. 8 is a diagram showing an example of a configuration of a bound management table T3000 included in the host computer 1000. The bound management table T3000 manages the associations between an ALU and SLUs bound to the ALU. The bound management table T3000 is referred to when processing is performed by the disk control unit 1231 included in the hypervisor 1230, the storage management program 1220, or the virtual machine management program 1210, and can be accessed from various programs included in the management computers 3000 and 4000 via the management network 6000 using the API provided by the host computer 1000.

The bound management table T3000 includes the column ALU ID T3010 that registers the identifier of an ALU 2120 registered in the logical path management table T2000 and the column BOUND VOL ID T3020 that registers the identifiers of SLUs 2400 bound to the ALU 2120.

FIG. 9 is a diagram showing examples of configurations of LUN management tables T4000 included in the storage device 2000. A LUN management table T4000 manages LUNs provided by the storage device 2000. The storage device 2000 refers the LUN management table T4000 when the storage device 2000 performs logic path processing or logic path evaluation processing, and the management computer 3000 connected to the management network 6000 can also refer to the LUN management table T4000 using a management API provided by a storage management server 2500 on the storage device 2000.

The LUN management table T4000 includes: the column PORT ID T4010 that registers the identifier of a logical port 2110; the column PORT WWN T4020 that registers the WWN of the relevant logical port 2110; the column LUN T4030 that registers the identifier of a LUN; the column STATUS T4040 that registers the status of the LUN; and the column LDEV ID T4050 that registers the identity of a logical volume that composes the LUN. Here, a LUN is assigned to a logical volume associated with a logical port 2110 as the identifier of the logical volume. The after-mentioned LDEV ID identifies a logical volume uniquely in the storage device 2000, while a LUN identifies a logical volume uniquely among logical volumes associated with a logical port 2110.

Each of FIG. 10 and FIG. 11 is a diagram showing an example of a configuration of a logical volume management table T5000 included in the storage device 2000. FIG. 10 shows a logical volume management table T5000a included in the storage device 2000a, and FIG. 11 shows a logical volume management table T5000b included in the storage device 2000b. The logical volume management table T5000 manages logical volumes provided by the storage device 2000. The storage device 2000 refers the logical volume management table T5000 when the storage device 2000 performs logical volume configuration control or data duplication control, and the management computer 3000 connected to the management network 6000 can also refer to the logical volume management table T5000 using a management API provided by the storage management server 2500 on the storage device 2000.

The logical volume management table T5000 includes: the column LDEV ID T5010 that registers the identifiable identifiers of logical volumes in the storage device; the column ATTRIBUTES T5020 that registers attribute information regarding the relevant logical volumes; the column CAPACITY T5030 that registers the capacities of the relevant logical volumes; the column PAIR LDEV ID T5040 that registers the identifiers of logical volumes that belong to another storage device and whose data are obtained by duplicating data of some of the relevant logical volumes; and the column PAIR STATUS T5050 that registers the statuses of the relevant duplicated pairs.

FIG. 12 is a diagram showing examples of configurations of CTG management tables included in the storage device 2000. A CTG management table T6000 is referred to when the configuration of a logical volume is controlled, the duplication processing of data is performed, and the evaluation processing of a logical path is performed in the storage device 2000, and the CTG management table T6000 can be referred to through the management computer 3000 connected to the management network 6000 using a management API provided by the storage management server 2500 on the storage device 2000.

The CTG management table T6000 includes the column CTG ID T6010 that registers CGT identifiers, the column LDEV ID T6020 that registers the identifiers of logical volumes that are components of the CTG, the column PAIR CTG T6030 that registers the identifier of a CTG, to which the duplication destination the logical volumes in the CTG belong, the column STATUS T6040 that registers the integrated evaluation values of the data duplication statuses of the logical volumes in the CTG, and the column VM ID T6050 that registers the identifier of a VM 1900 that uses the logical volumes in the CGT. The integrated evaluation value registered in the column 6040 shows pair statuses as the CTG that are obtained by integratedly evaluating the pair statuses of the logical volumes in the CTG. In the first embodiment, SLUs belonging to the same CTG are bound to one ALU, that is to say, the SLUs in the CTG have one logical path in common. Therefore, the pair statuses of logical volumes in the CTG can be integrally evaluated instead of each SLU being evaluated, with the result that an optimal logical path control can be performed, and the number of I/O transfers among the storage devices 2000 can be reduced.

FIG. 13 is a diagram showing examples of configurations of bound management tables T7000 included in the storage device 2000. A bound management table T7000 is referred to when the binding processing is performed in the storage device 2000, and the bound management table T7000 can be referred to through the management computer 3000 connected to the management network 6000 using a management API provided by the storage management server 2500 on the storage device 2000.

The bound management table T7000 includes the column ALU ID T7010 that registers an identifier of an ALU 2120 included in the storage device 2000 that is identifiable in the storage device, and the column BITMAP T7020 that registers a bitmap showing a list of bound SLUs.

The configuration of a bitmap of the column T7020 will be explained below. Each bit of the bitmap corresponds to the identifier of an SLU 2400. The length of the bitmap is equal to the number of logical volumes included the storage device 2000. For example, in the case where the identifier of a logical volume is represented by hexadecimal form "0x0000", the first bit represents the relevant volume, and if the logical volume "0x0000" is bound to the ALU 2120 registered in the column T7010, the relevant bit is "1", and if it is not bound, the relevant bit is "0". A bound management table T7 000a shows that the logical volume 01:01 is bound to ALU 00:00.

Hereinafter, VM creation processing according to this embodiment will be explained with reference to FIG. 14. First, the VM administrator transmits VM creation instruction to the virtual machine management software 4110 via a GUI (graphical user interface) provided by the input/output unit included in the management computer 4000 (at step S1000). The VM creation instruction is given characteristic information required of a VM to be created, and it will be assumed that "HA" that shows high availability is specified in this embodiment. In addition, the number and capacity of SLUs are specified in this VM creation instruction.

Next, the virtual machine management software 4110 transmits the VM creation instruction to the virtual machine management program 1210 included in the host computer 1000 via the management network 6000 (at step S1010). The virtual machine management program 1210 transmits the creation instruction of logical volumes of which the VM is composed, that is to say, the creation instruction of SLUs 2400 to the storage management program 1220 which is also included in the host computer 1000 (at step S1020).

The storage management program 1220 transmits the creation instruction of the SLUs 2400, which indicates that the storage device 2000 under the control of the storage management software 3110 included in the management computer 3000 should create the SLUs 2400, to the storage management software 3110 (at step S1030). The storage management software 3110 instructs the storage device 2000 to create the SLUs 2400 (at step S1035), and after the completion of the creation of the SLUs 2400, the storage management software 3110 transmits the identifiers of the created SLUs 2400 to the storage management program 1220. The storage management program 1220 transmits the received identifiers of the SLUs 2400 to the virtual machine management program 1210.

Next, the virtual machine management program 1210 registers the ID of the new VM in the column T1010 of the VM management table T1000, the received identifiers of the SLUs 2400 and the capacities of the SLUs 2400 in the column T1020 and the column T1030 relevant to the new VM respectively, and further registers a profile specified in the VM creation request in the column T1040. The virtual machine management program 1210 transmits the binding instruction for the SLUs registered in the column T1020 to the storage management program 1220 (at step S1040), and the storage management program 1220 instructs the storage management software 3110 to execute the specified binding instruction for the SLUs (at step S1050). After the completion of the binding processing executed in the storage device 3000, the virtual machine management program 1210 executes VM image write processing for the bound SLUs 2400 to the virtual machine control unit 1231 and the disk control unit 1232 of the hypervisor 1230 (at step S1060). After the completion of the VM image write processing, the virtual machine management program 1210 issues the unbinding instruction of the relevant SLUs 2400 (at step S1070). On receiving the unbinding instruction from the virtual machine management program 1210, the storage management program 1220 transmits the unbinding instruction to the storage management software 3110 (at step S1080). After the unbinding processing is completed, the storage management software 2110 transmits a VM creation completion response including the identifier of the created VM to the virtual machine management software 4110, which is the sender of the VM creation instruction, via the storage management program 1220 and the virtual machine management program. 1210, and the virtual machine management software 4110 informs the VM administrator of the completion of the virtual machine creation processing.

Here, the SLU 2400 creation processing at step S1035 will be explained with reference to FIG. 15.

Figure 14:
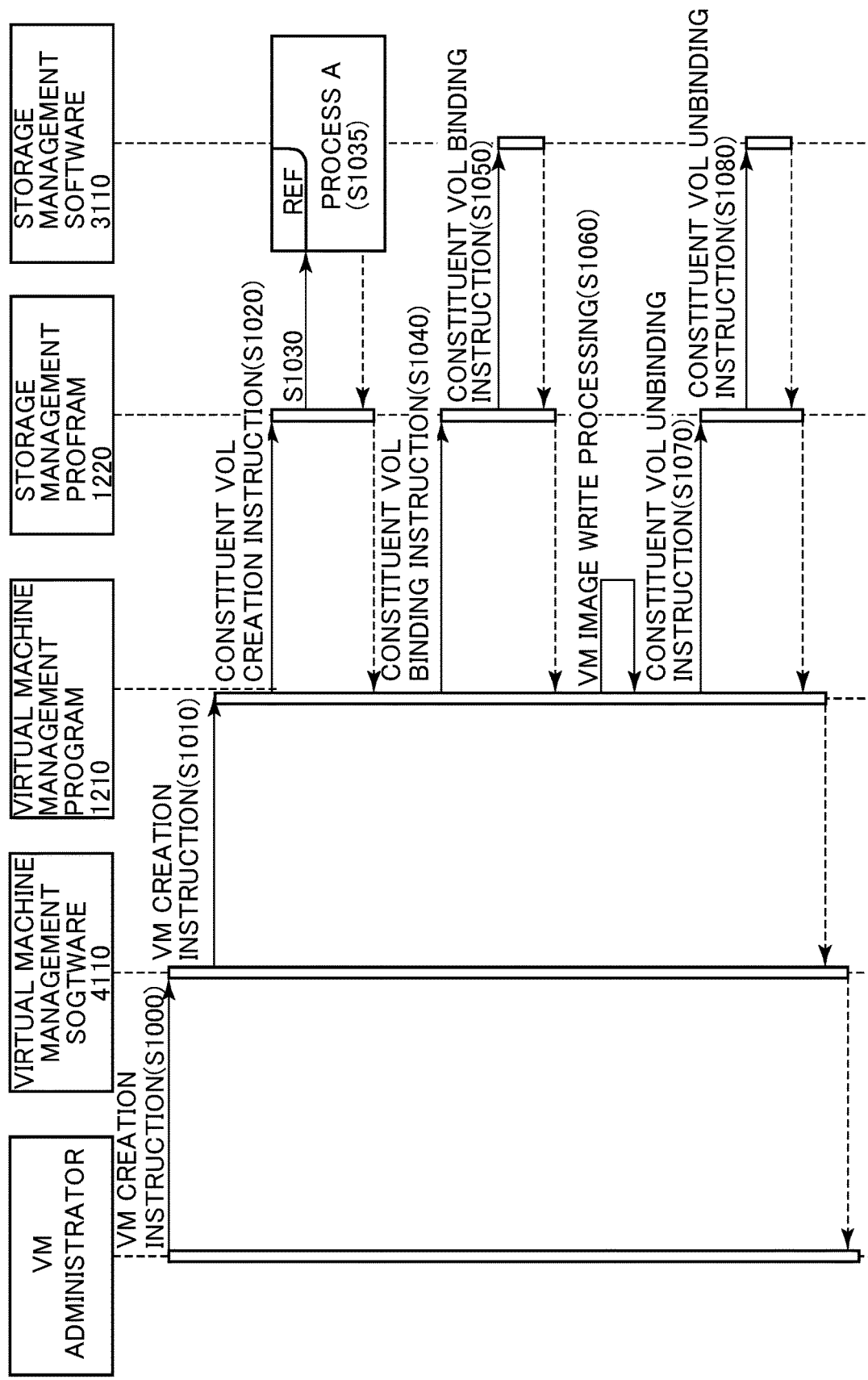
FIG. 14 is a diagram showing an example of virtual server creation processing.
Figure 15:
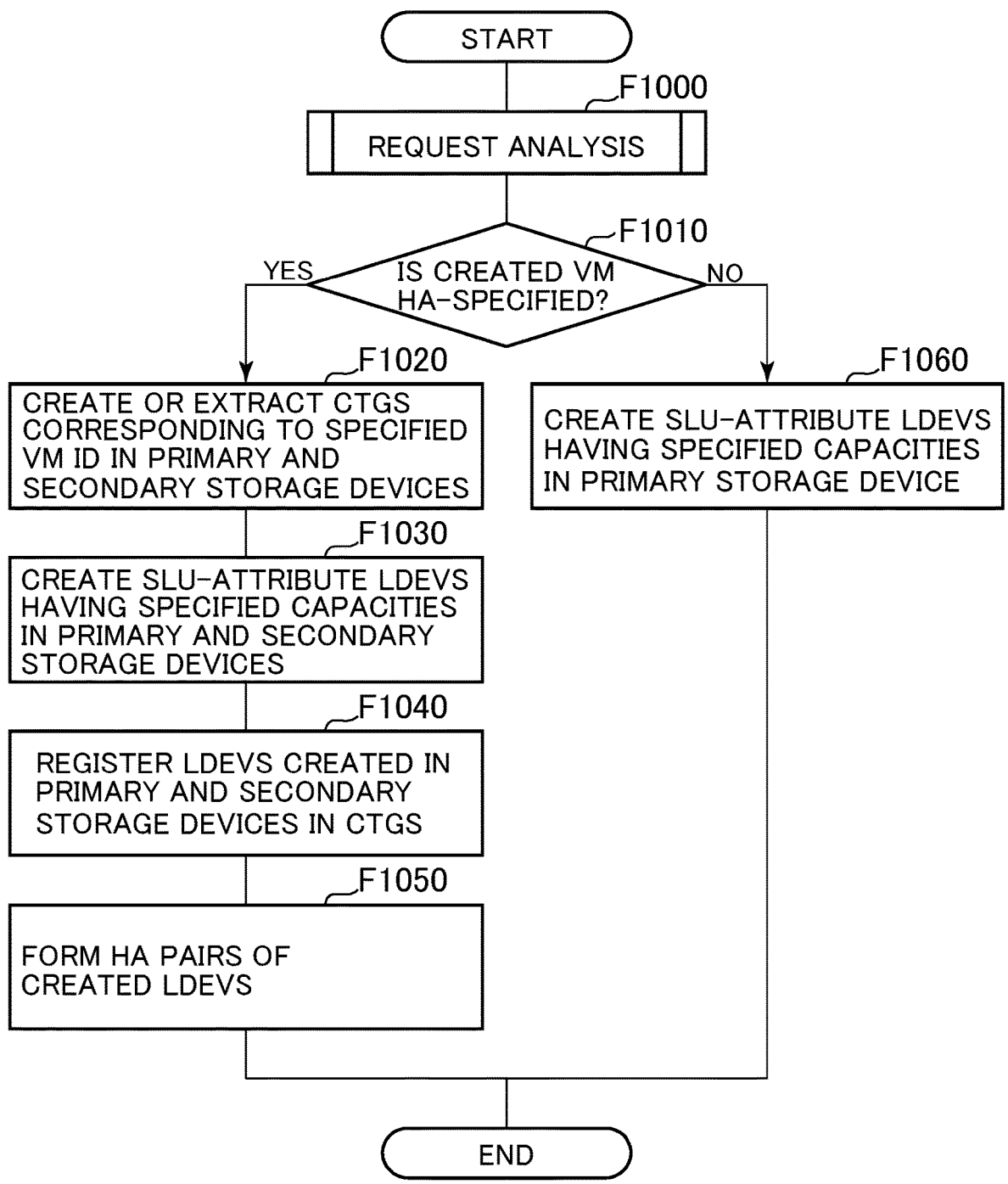
FIG. 15 is a diagram showing an example of a flowchart of logical resource creation processing that is included in the storage device and needed at the time of the virtual server creation.

FIG. 15 is equivalent to the storage resource creation processing (at step S1035) in the VM creation shown in FIG. 14, in which the storage management software 3110 receives an SLU 2400 creation instruction from the storage management program 1220, and the following processing starts. First, the storage management software 3110 extracts the identifier (ID) and profile specified for a VM to be created and the number and capacity of logical volumes to be created for the VM to be created from the logical volume creation instruction (at step F1000). The storage management software 3110 checks whether "HA" is specified in the profile of the VM to be created or not (at step F1010). If "HA" is not specified (No at step F1010), the storage management software 3110 creates SLUs 2400, the number and capacity of which are the same as the specified number and capacity, in the primary side storage device 2000a of the storage cluster (at step F1060), and finishes this processing.

If "HA" is specified (Yes at step F1010), the storage management software 3110 instructs the storage devices 2000a and 2000b, which compose the storage cluster, to create CTGs 2500 corresponding to the VM to be created (at step F1020), and after the completion of the CTGs 2500, the storage management software 3110 instructs each of the storage devices 2000a and 2000b to create SLUs 2400 the number and capacity of which are the same as the specified number and capacity (step F1030). The storage management software 3110 instructs the storage devices 2000a and 2000b to register the created SLUs 2400 in the CTGs created or extracted at step F1020 (at step F1040), specifies the CTGs 2500 created at step F1020, instructs the storage devices 2000a and 2000b to form HA pairs (at step F1050), and finishes this processing.

In this processing, on receiving the instruction of creating the CTGs 2500 corresponding to the created VM at step F1020, each of the configuration control units of the storage devices 2000a and 2000b refers to the CTG management table T6000, and scans the column T6050 to check whether there is the specified VM ID of or not. If the specified VM ID is registered in the CTG management table T6000, the configuration control unit sends back the CTG ID of a CTG in which the specified VM ID is registered. If the specified VM ID is not registered in the CTG management tables T6000, the configuration control unit registers a new CTG, registers the specified VM ID in the column T6050 of the new CTG, and sends back the ID of the new CTG.

Furthermore, on receiving the instruction to create the SLUs 2400 the number and capacity of which are the same as the specified number and capacity at step F1030, the configuration control unit creates LDEVs which are given an SLU-attribute indicating the specified number and specified capacity of SLUs, registers the new LDEVs in the logical volume management table T5000, and transmits the notification of completion including the LDEV IDs of the new LDEVs At step F1040, on receiving the instruction to register the SLUs 2400 in the CTG, the configuration control unit refers to the CTG management table T6000 in order to register the specified LDEVs in the specified CTG, and registers the IDs of the specified LDEVs in the column T6020 of the specified CTG.

On receiving the HA pair formation instruction at step F1050, the data duplication control unit registers the identifier of a data duplication destination CTG in the column 6030 of the CTG management table 6000, and creates pairs of LDEVs in the CTG. In the initial data duplication in the pair formation, because the data storage statuses among the logical volumes are mismatched with one another, in the case where only the primary side LDEVs are data-writable, the statuses of the primary side LDEVs are set to "COPY (LOCAL)" statuses which mean that the primary side LDEVs are being copied and I/O processing can be performed on the primary side LDEVs, and the secondary side LDEVs are set to "COPY (BLOCK)" statuses which mean that the secondary side LDEVs are being copied and I/O processing can be performed on the secondary side LDEVs. Furthermore, in the case where the data storage statuses of both primary side and secondary side LDEVs become matched, the LDEV statuses of both primary side and secondary side LDEVs become "PAIR (MIRROR)", which means that I/O processing can be performed on both primary side and secondary side LDEVs. In the case where I/O processing cannot be performed on the secondary side LDEVs due to some disaster or another, the primary side LDEVs are in the status that each of pairs is not in synchronization with each other, so that the statuses of the primary side LDEVs become "PSUS (LOCAL)" statuses which mean that I/O processing can be performed only on the primary side LDEVs, and the secondary side LDEVs are in the status that each of pairs is not in synchronization with each other, so that the statuses of the secondary side LDEVs become "PSUS (BLOCK)" statuses which mean that I/O processing cannot be performed on the secondary side LDEVs. In the case where I/O processing cannot be performed on the primary side LDEVs due to some disaster or another, the primary side LDEVs are in the status that each of pairs is not in synchronization with each other, so that the statuses of the primary side LDEVs become "SSWS (BLOCK)" statuses which mean that I/O processing cannot be performed on the primary side LDEVs, and the secondary side LDEVs are in the status that each of pairs is not in synchronization with each other, so that the statuses of the secondary side LDEVs become "SSWS (LOCAL)" statuses which mean that I/O processing can be performed only on the secondary side LDEVs. The statuses of these LDEV duplicate pairs are registered in the column T5050 of the logical volume management table T5000.

The value obtained by integratedly evaluating the pair statuses of all the LDEVs in the relevant CTG is registered in the column T6040, and if there is only one pair whose status is not "PAIR" status, the CTG status becomes the status of the pair.

To put it concretely, even if there is only one SLU 2440 whose status is "COPY (BLOCK)", "PSUS (BLOCK)", or "SSWS (BLOCK)" (hereinafter, these statuses are referred to as "BLOCK" statuses) in one CTG, "BLOCK" is registered in the column T6040. Even if there is no SLU 2400 whose status is "COPY (BLOCK)", "PSUS (BLOCK)", or SSWS (BLOCK)", but there is only one SLU 2400 status is "COPY (LOCAL)", "PSUS (LOCAL)", or SSWS (LOCAL)" (hereinafter, these statuses are referred to as "LOCAL" statuses) in one CTG, "LOCAL" is registered in the column T6040. In the case where the statuses of all the SLUs 2400 in one CTG are "PAIR (MIRROR)", "PAIR" is registered in the column T6040.

Figure 16:
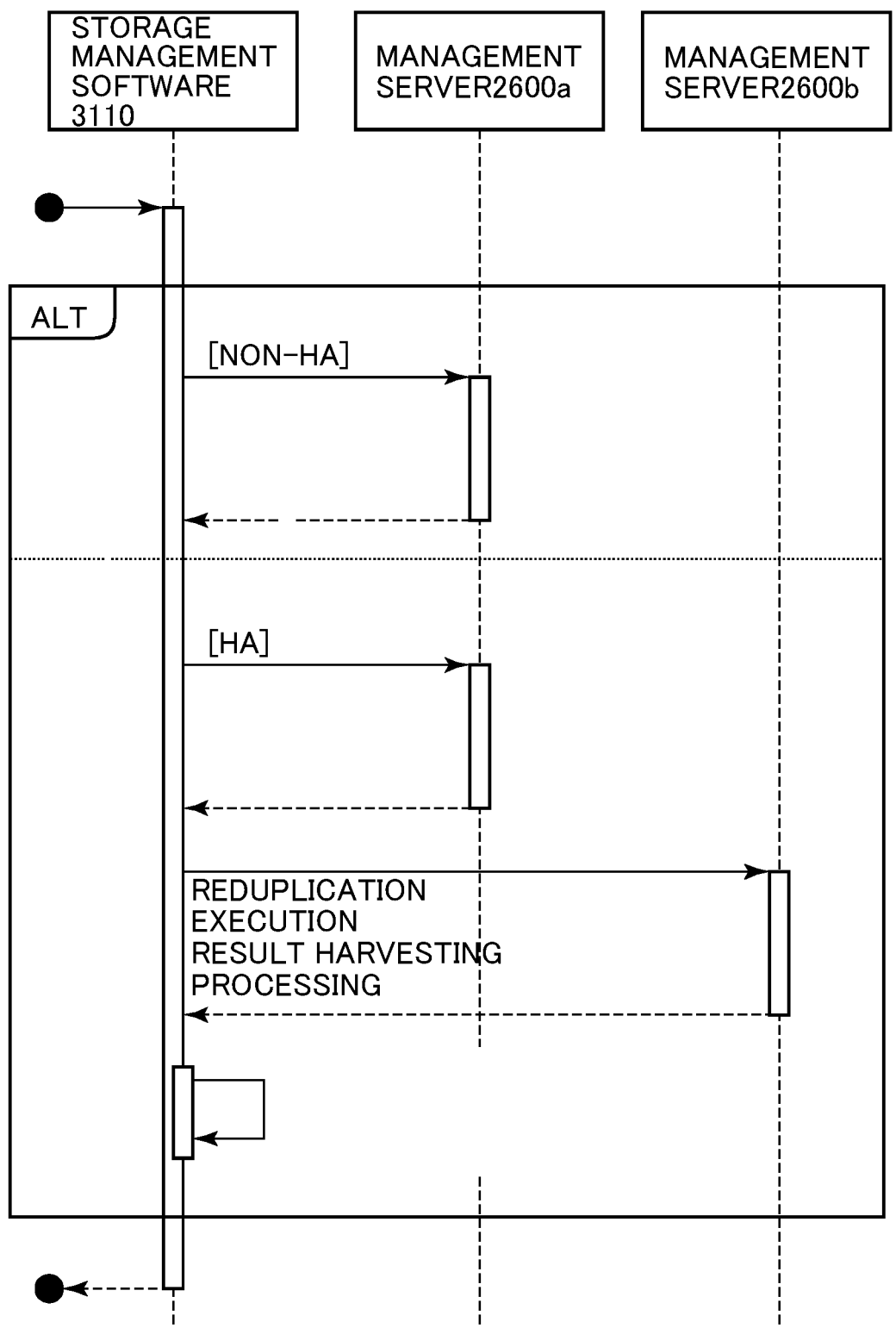
FIG. 16 is a diagram showing an example of storage resource operation processing in the configuration of a storage cluster.

FIG. 16 is a diagram showing an example of a sequence of LDEV configuration operation instruction that the storage management software 3110 transmits to the storage devices 2000a and 2000b. In the case of the configuration of an operation target LDEV is HA configuration, the storage management software 3110 transmits the same LDEV configuration operation instruction to the two storage devices 2000 having HV configuration LDEVs, and if both storage devices 2000 finish this configuration operation normally, the storage management software 3110 responses with the normal completion of the configuration operation to the requestor. If one of the two storage devices finishes this configuration operation abnormally, the storage management software 3110 gets back a storage device 2000 that finishes the configuration operation normally in the status before the storage device 2000 is operated, and notifies the requestor of the abnormal completion of the configuration operation. If both storage devices finish this configuration operation abnormally, the storage management software 3110 notifies the requestor of the abnormal completion of the configuration operation.

Figure 17:
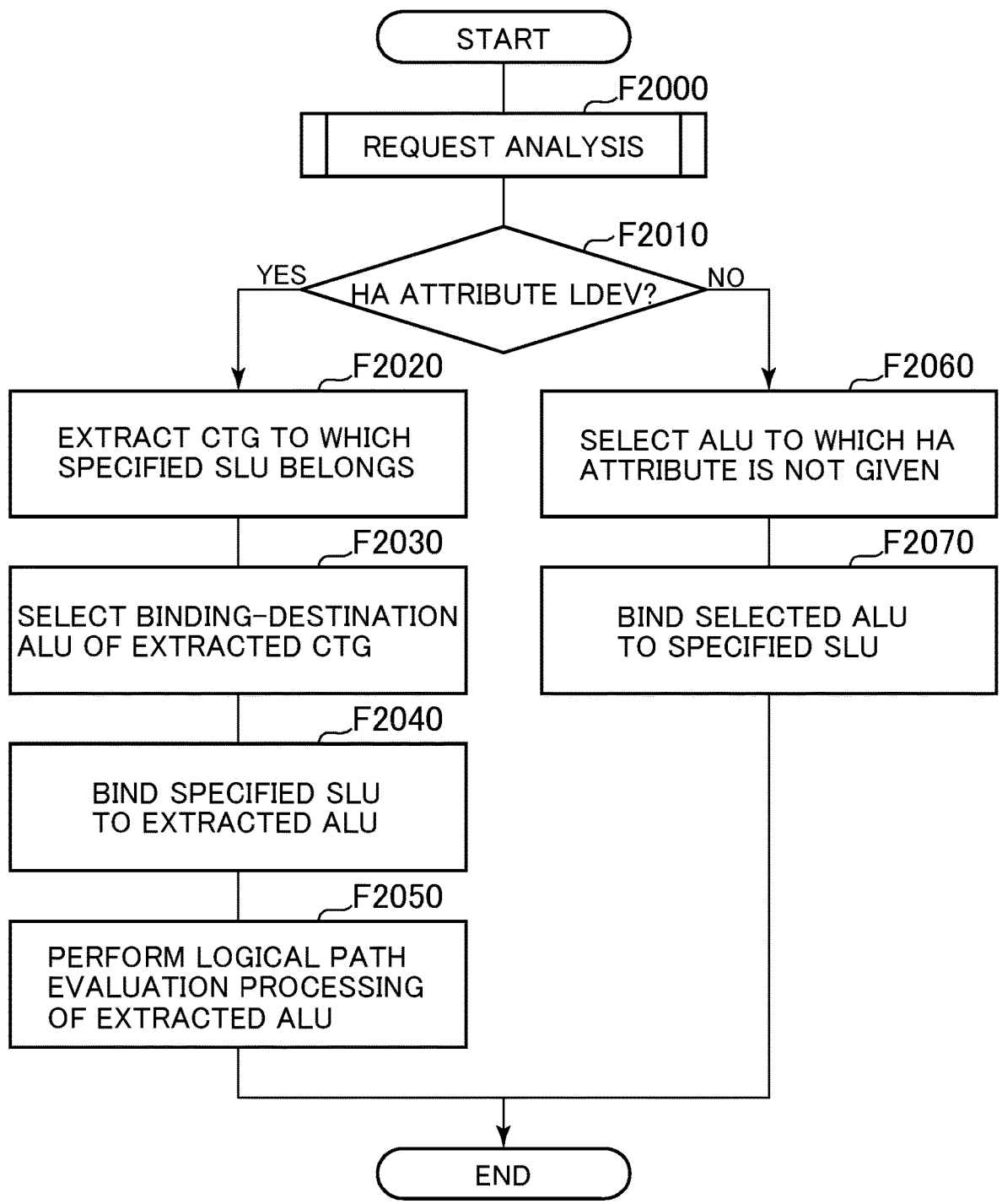
FIG. 17 is a diagram showing an example of a flowchart of logical path evaluation processing included in the storage device.

FIG. 17 is a diagram showing an example of a configuration of a flowchart of binding processing in the configuration control unit included in the storage device 2000. The binding processing is started on receiving a binding instruction from the storage management software 3110 that receives the constituent VOL binding instruction at step S1050.

In the binding processing, the configuration control unit extracts a binding target SLU 2400 from the binding instruction (at step F2000), and checks whether the specified SLU 2400 is an HA configuration volume or not with reference to the logical volume management table T5000 (at step F2010). If the specified SLU 2400 is not an HA configuration volume (NO at step F2010), the configuration control unit selects an ALU 2120 that is not given HA attribute from the logical volume management table T5000 (at step F2060), changes the value of a bit relevant to the specified SLU 2400 in a bitmap in the column T7020 corresponding to the ALU 2120 into "1" with reference to the bound management table T7000 (at step F2070), and then finishes this processing.

If the specified SLU 2400 is an HA configuration volume (YES at step F2010), the configuration control unit extracts a CTG 2500 to which the specified SLU 2400 belongs with reference to the CTG management table T6000 (at step F2020), and a list of LDEVs of the CTG 2500 extracted with reference to the CTG management table T6000 is extracted, and further the configuration control unit selects an ALU relevant to any of the extracted LDEV that is bounded with the column T7020 of the bound management table T7000 (at step F2030). If there is no relevant ALU at step F2030, the configuration control unit extracts one LDEV that is not given HA attribute with reference to the logical volume management table T5000, and sets the LDEV as a selected ALU 2120. Next, the configuration control unit performs binding processing by changing the value of a bit relevant to the specified SLU 2400 corresponding to the ALU 2120 selected at step F2030 into "1" in the column T7020 (at step F2040), performs logical path evaluation processing (at step F2050), and then finishes this processing. This processing is characterized in that SLUs 2400 belonging to the CTG 2500 are bound to the same ALU 2120.

Figure 18:
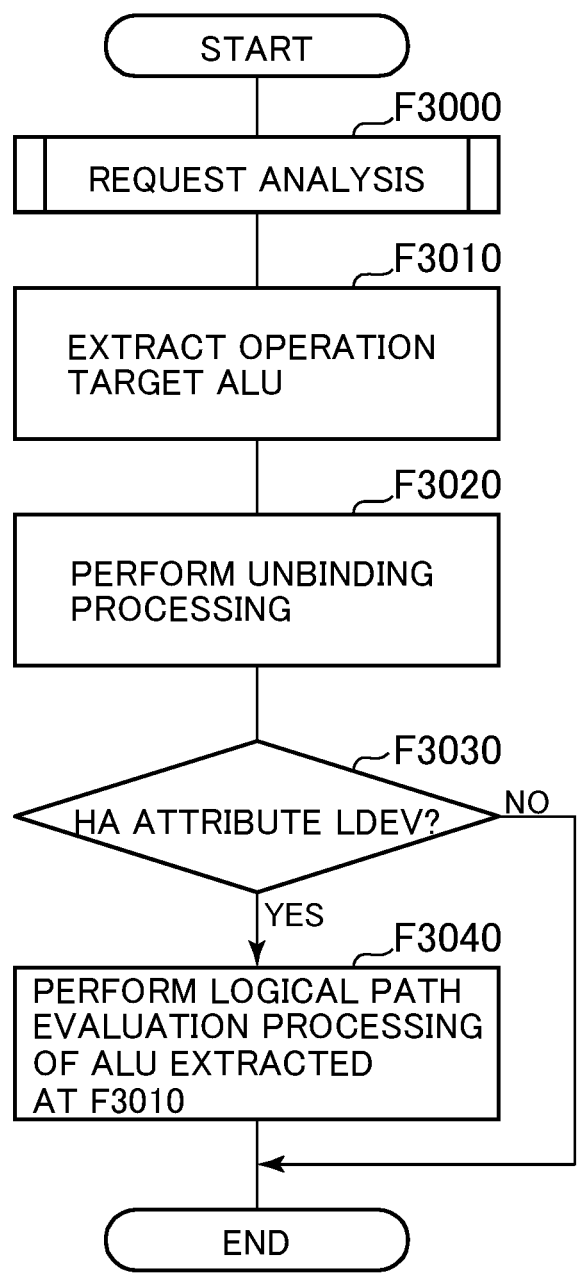
FIG. 18 is a diagram showing an example of a flowchart of binding processing included in the storage device.

FIG. 18 is a diagram showing an example of a configuration of a flowchart of unbinding processing in which the configuration control unit of the storage device 2000 releases the binding of SLUs 2400. In the unbinding processing, the configuration control unit extracts an ALU 2120 to which a specified SLU 2400 is bound to reference to the bound management table T7000 (at step F3010), and changes the value of a bit of a bitmap in the column 17020 relevant to the specified SLU 2400 corresponding to the ALU 2120 in the bound management table T7000 into "0" (at step F3020). This unbinding processing is characterized in that, if the specified SLU 2400 is HA configuration volume (Yes at step F3030), the logical path control unit performs logical path evaluation processing regarding the ALU 2120 extracted at step F3010.

Hereinafter, logical path evaluation processing according to this embodiment will be explained.

Figure 19:
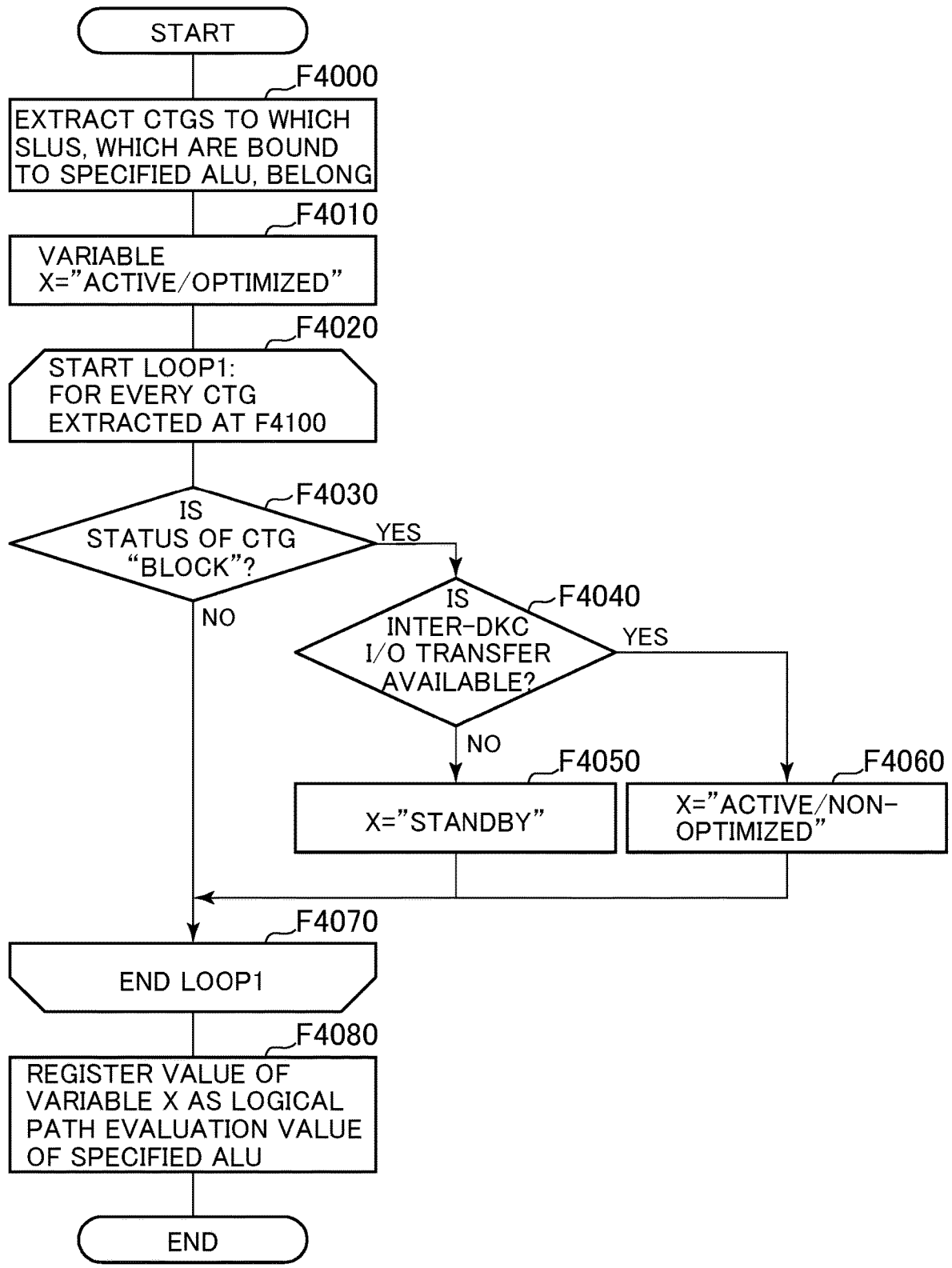
FIG. 19 is a diagram showing an example of a flowchart of unbinding processing included in the storage device.

FIG. 19 is a diagram showing an example of a configuration of a flowchart of the logical path evaluation processing performed by the logical path control unit of the storage device 2000. The logical path evaluation processing is performed after a binding processing control unit binds an SLU 2400 to an ALU 2120 (at step F2050) or when the status of a CTG 2500 is changed in the data duplication control unit (at step F3040).

In the logical path evaluation processing, the configuration control unit calculates SLUs 2400 bound to an ALU 2120 specified by a specification source control unit with reference to the bound management table T7000, and extracts CTGs 2500 to which the SLUs 2400 belong from the CTG management table T6000 (at step F4000). The configuration control unit sets "ACTIVE/OPTIMIZED" as the initial value of a logical path evaluation value X (at step F4010), and performs loop processing at step F4020 on the CTGs 2500 extracted at step F4000. The configuration control unit performs the loop processing on every CTG 2500. First, the configuration control unit refers to the column T6040 of the CTG management table T6000, and if the status of the relevant CTG 2500 is BLOCK status (Yes at step F4030), that is to say, the status in which the relevant CTG 2500 cannot receive an I/O, the configuration control unit checks whether the storage device 2000 includes an inter-storage device I/O transfer function or not, and whether an I/O transfer is available or not (at step F4040). If the I/O transfer is not available (No at step F4040), the configuration control unit sets the value of the logical path evaluation value X to "STANDBY" (at step F4050), and if the I/O transfer is available (Yes at step F4040), the configuration control unit sets the value of X to "ACTIVE/NON-OPTIMIZED" (at step F4060). After the loop processing at step F4020 is completed, the configuration control unit registers the value of X in the column T4040 of a row corresponding to the column T4050 in which the LDEV ID of the specified ALU 2120 is registered with reference to the LUN management table T4000 (at step F4080), and then finishes this processing.

The inter-storage device I/O transfer function will be explained below. If the pair status of an LDEV is "BLOCK" status, it is impossible to perform I/O processing on the LDEV. However, in the case where the storage device 2000 includes the inter-storage device I/O transfer function, an I/O is transferred between the storage devices in order to perform the relevant I/O processing on a volume that makes a pair in cooperation with the LDEV. For example, the storage device 2000b including a secondary side LDEV transfers an I/O to the storage device 2000a, so that the I/O is transferred to a primary side LDEV ("COPY (LOCAL)") that makes a pair in cooperation with the secondary side LDEV, and the I/O can be performed by the primary side LDEV. In a similar way, a storage device 2000 including the inter-storage device I/O transfer function transfers an I/O to be performed on a logical volume whose status is "PSUS (BLOCK)" or "SSWS (BLOCK)" to another storage device 2000, and can perform the I/O processing using another logical volume that makes a pair in cooperation with the former logical volume.

As explained above, in the case where STSATUS of a CTG in the column T6040 of the CTG management table T6000 is "PAIR (MIRROR)" or "LOCAL", I/O processing can be performed in the storage device 2000 itself. Therefore it is not necessary to execute an I/O transfer between the storage devices 2000 and the delay of the I/O does not occur, so that the status of the relevant logical path becomes "ACTIVE/OPTIMIZED". In the case where STATUS of the CTG is "BLOCK" status and the inter-storage device I/O transfer is available, I/O processing can be performed although the response delay due to the I/O transfer occurs, therefore the status of the relevant logical path becomes "ACTIVE/NON-OPTIMIZED". In the case where STATUS of the CTG is "BLOCK" status and the inter-storage device I/O transfer is not available, I/O processing cannot be performed, therefore the status of the relevant logical path becomes "STANDBY".

When the logical path evaluation processing according to this embodiment is performed, the evaluation value of the logical path of an ALU 2120 in the case where an I/O transfer between the storage devices 2000 or retry does not occur can be kept "ACTIVE/OPTIMIZED" in accordance with binding processing or data duplication processing.

Second Embodiment

In the first embodiment, because plural CTGs 2500 have an ALU 2120 in common, if there is only one CTG 2500 the status of which is other than "PAIR (MIRROR)" of the plural CTGs 2500 having the ALU 2120 in common, the evaluation of the logical path of the ALU 2120 becomes other than "ACTIVE/OPTIMIZED", with the result that a situation where no logical path the status of which is "ACTIVE/OPTIMIZED" status exists occurs.

In this embodiment, logical path control in which one or more logical paths the statuses of which are "ACTIVE/OPTIMIZED" are secured per CTG 2500, that is to say, per VM 1900, or per job will be explained. Due to this configuration, the status of a logical path can be prevented from being adversely affected by various kinds of jobs.

Figure 20:
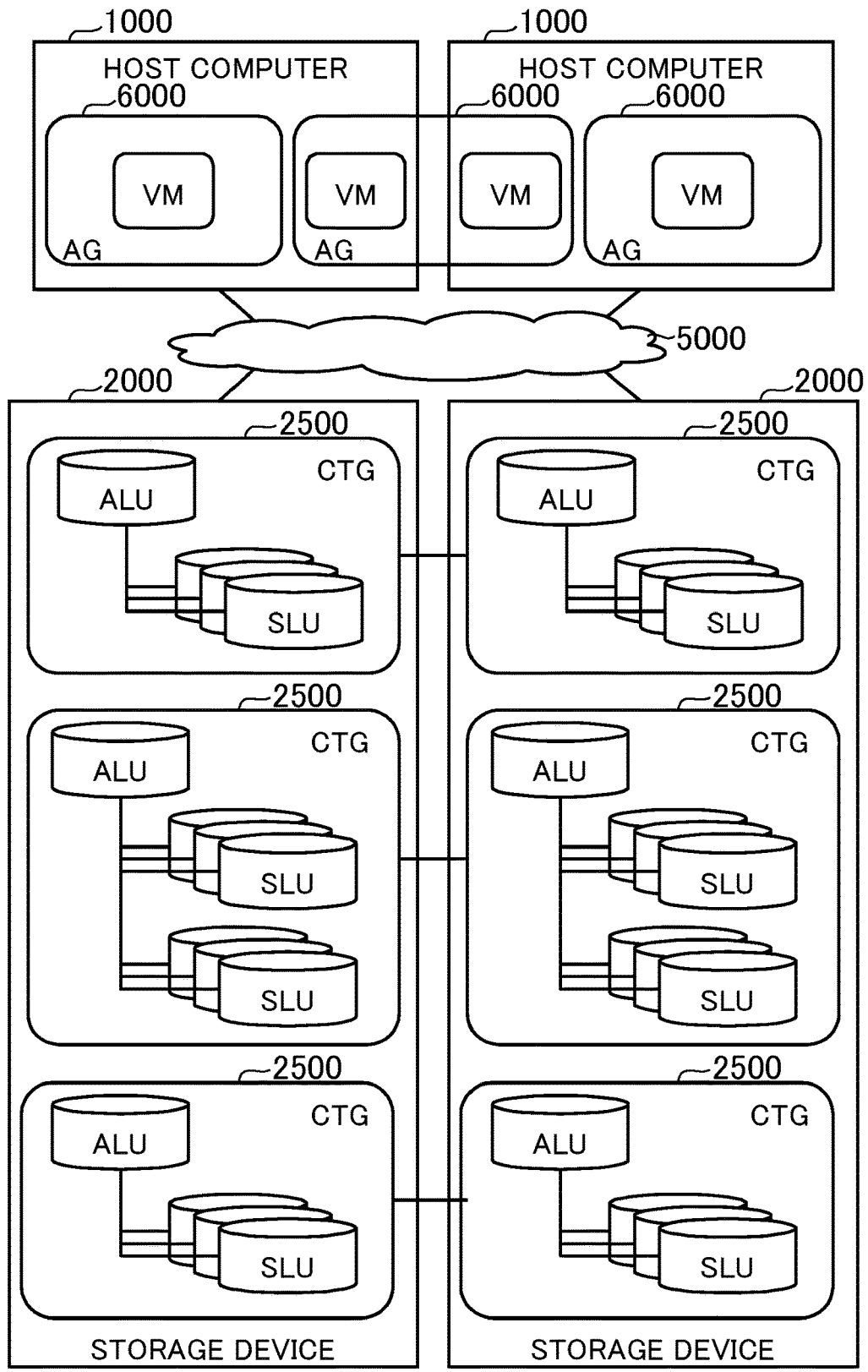
FIG. 20 is a diagram showing an example of a configuration of a storage system.

FIG. 20 is a diagram showing an example of a configuration of a storage system according to this embodiment. Each storage system according to this embodiment is different from the storage system according to the first embodiment in that the host computer 1000 includes a logical partition control unit that classifies VMs into AGs (Availability Groups) 7000 per VM or per job, and other components of this embodiment are the same as those of the first embodiment. It is conceivable that VMs having the same characteristic information are made to belong to the same AG. In other words, the same value is stored in the column PROFILE T1040 of the VM management table T1000 regarding each of VMs belonging to the same AG.

Hereinafter, a means for classifying VMs 1900 into AGs 7000 that are logical partitions; a storage system including: a means for building up CTGs 2500 per AG 7000; a means for assigning ALUs 2120 per CTG 2500 will be explained.

First, in order to classify VMs 1900 into AGs 7000, the VM administrator assigns an identifier for identifying an AG 7000 to the profile given to each VM. The identifier can be an arbitrary character string defined by the VM administrator or an identifier defined in advance in the virtual machine management software 4110 by the VM administrator. The assigned identifier for the AG 7000 is included the configuration operation instruction used at steps S1000 to S1035 in the VM creation sequence shown in FIG. 14. To put it concretely, the assigned identifier for the AG 7000 is registered in the column T1040 of the VM management table T1000 in the VM creation processing by the host computer 1000, and the storage device 2000 registers the assigned identifier for the AG 7000 in the column T8050 of a CTG management table T8000 shown in FIG. 21 when a CTG 25000 is created.

Hereinafter, logical volume creation processing for creating logical volumes composing a VM performed in the storage device 2000 will be explained with reference to FIG. 22. In the second embodiment, processing shown in FIG. 22 is performed instead of the storage resource creation processing in the VM creation shown in FIG. 15.

Figure 22:
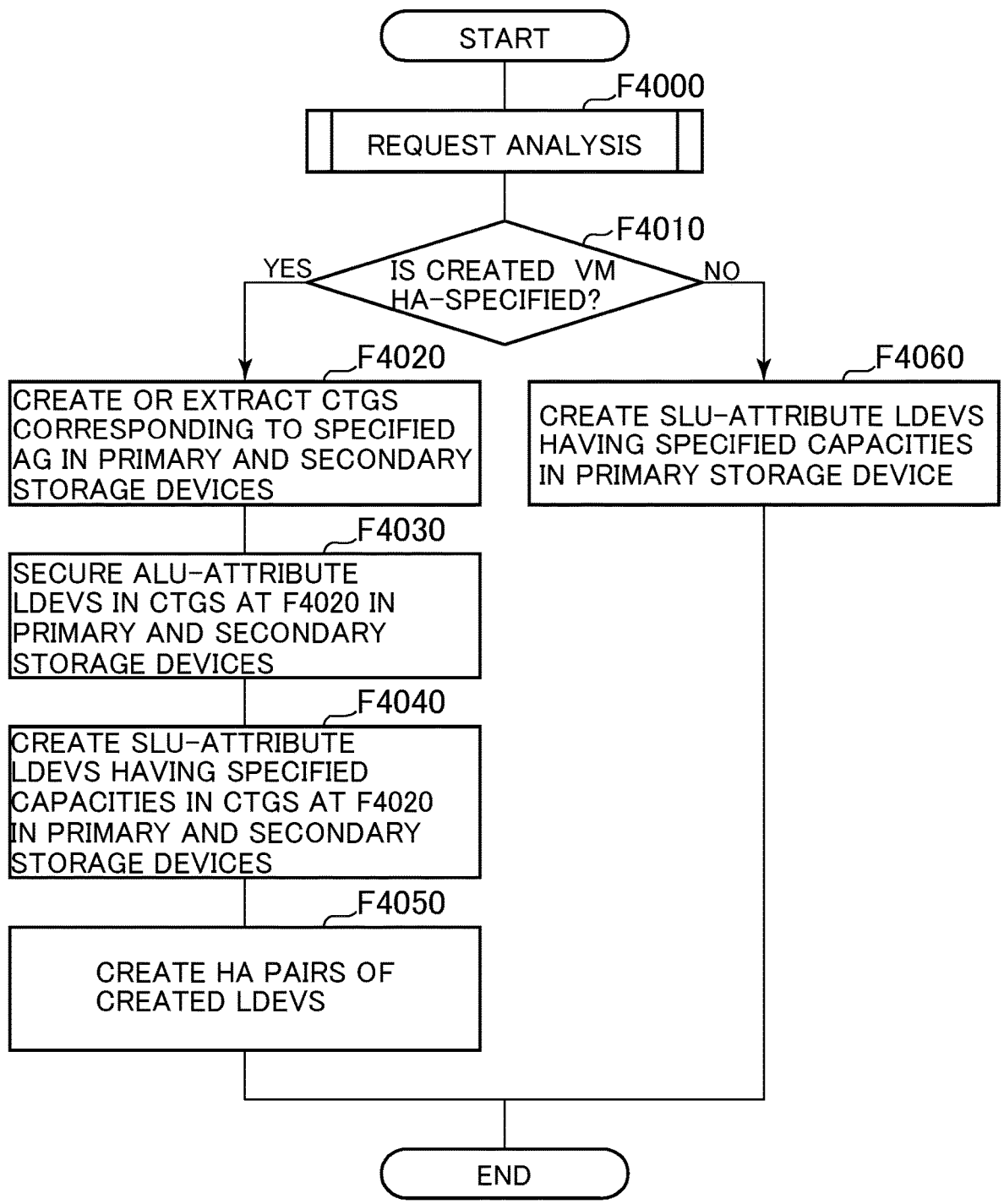
FIG. 22 is a diagram showing an example of a flowchart of logical resource creation processing included in the storage device.

FIG. 22 is a diagram showing an example of a configuration of a flowchart of logical volume creation processing performed by the storage management software 3110 in a VM creation processing sequence. On receiving a logical volume creation instruction including the identifier for an AG 7000, the storage management software 3110 starts this processing, and checks whether HA is specified in a profile obtained from the creation instruction (at step F4010). If HA is not specified (No at step F4010), the storage management software 3110 creates the specified number of SLUs 2400 having specified capacities in a primary side storage device 2000a of a storage cluster (at step F4060), and finishes this processing. If HA is specified (Yes at step F4010), the storage management software 3110 creates the specified number of SLUs 24000 having specified capacities in the primary side storage device 2000a of the storage cluster (at step F1060), and finishes this processing. The storage management software 3110 instructs the storage devices 2000a and 2 000b that compose the storage cluster to create CTGs 2500 corresponding to the specified AG 7000 (at step F4020). After the creation of the CTG 2500 is finished, the storage management software 3110 instructs the storage devices 2000a and 2000b to create ALUs 2120 belonging to the CTGs 2500 created at step F4020 (at step F4030). Next, the storage management software 3110 instructs the storage devices 2000a and 2000b to create the specified number of SLUs 2400 having the specified capacities belonging to the CTGs 2500 created at step F4020 (at step F4040), instructs the storage devices 2000a and 2000b to form HA pairs of the created SLUs 2400 (at step F4050), and finishes this processing.

The storage device 2000, which receives the instruction of the creation of a CTG 2500 at step F4020; extracts the identifier of the AG 7000 in accordance with the creation instruction, refers to the CTG management table T8000; extracts a CTG 2500 corresponding to the specified AG 7000; and, if there is a relevant CTG 2500, the storage device 2000 sends back the relevant CTG 2500, and if there is no relevant CTG 2500, the storage device 2000 creates a new CTG 2500, and registers the identifier of the specified AG 7000 in the column T8050 of the created CTG 2500.

As described above, a CTG 2500 can be built up per AG 7000, and further one ALU 2120 can be set for the CTG 2500, with the result that, by applying the logical path evaluation processing shown in FIG. 19, it becomes possible to perform logical path evaluation on the ALU 2120 per AG 7000.

Third Embodiment

In the second embodiment, because an ALU 2120 is consumed per AG 7000, the depletion of ALUs 2120 occurs. In this embodiment, using a virtual port function included in the host computer 1000, one or more Initiator Ports are assigned to one AG 7000, and a VM 1900 uses any of Initiator Ports assigned to an AG 7000 to which the VM 1900 belongs. Hereinafter, a storage system in which the storage device 2000 performs the logical path evaluation of an ALU 2120 per Initiator Port will be explained.

Figure 23:
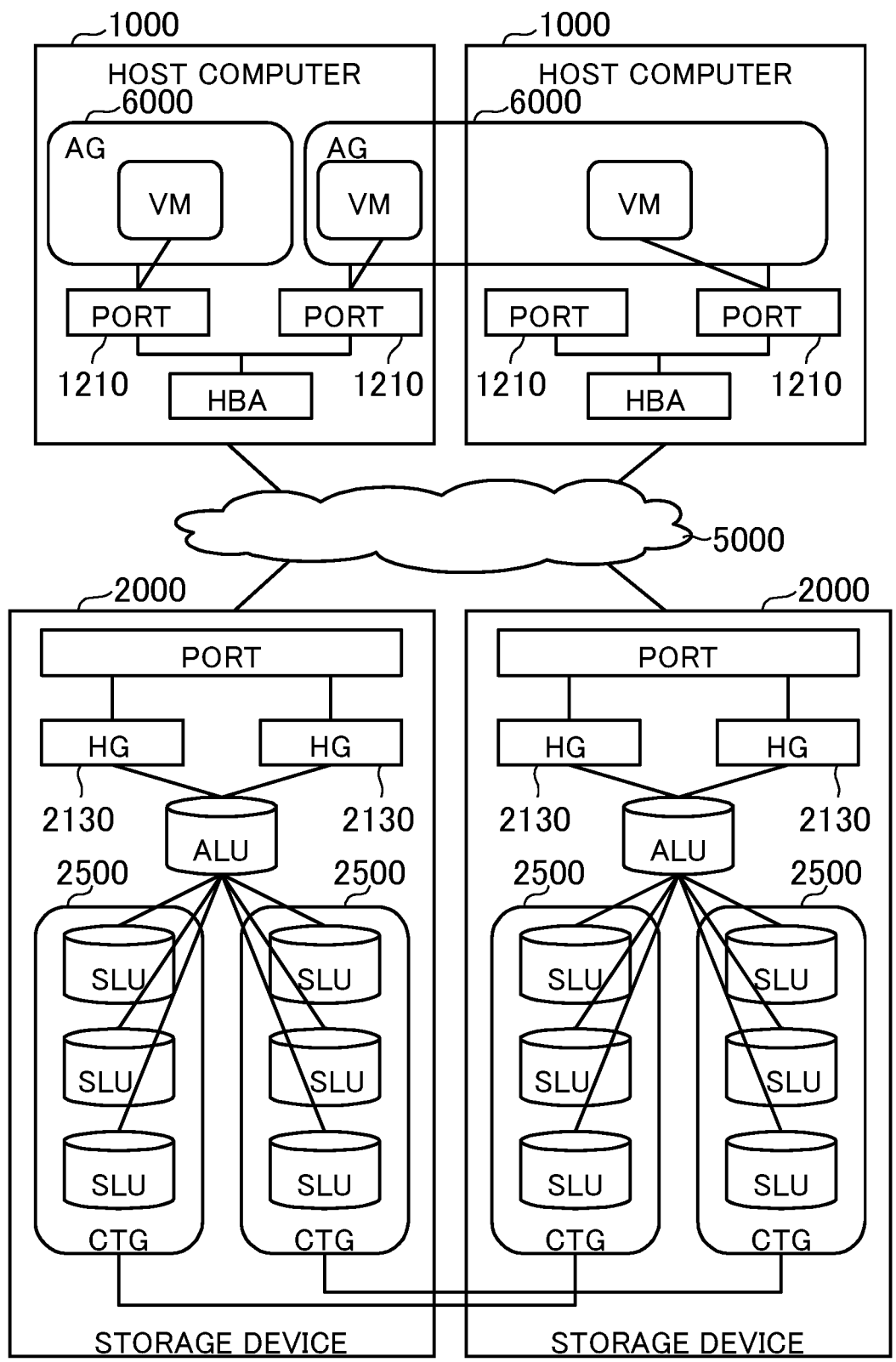
FIG. 23 is a diagram showing an example of a configuration of a storage system.

FIG. 23 is an example of a configuration of a storage system according to this embodiment. The hypervisor 1230 of the host computer 1000 includes a virtual port control unit, and performs virtual port allocation in which a virtual port 1210 is assigned per AG 7000.

In addition, a logical port 2110 of the storage device 2000 holds together Initiator Ports that enables a login (generally referred to as a fabric login) as an HG (Host Group) 2130 that is a logical partition per logical port 2110. An I/O from a logical path that passes through an HG 2130 includes an access restriction control unit that receives only from the WWN of a registered Initiator Port.

FIG. 24 is a diagram showing examples of configurations of virtual port management tables T9000 included in the host computer 1000. A virtual port management table T9000 is referred to when the virtual port control unit (not shown) of the hypervisor 1230 performs virtual port allocation processing and when the disk control unit 1232 and the alternate path control unit 1233 performs I/O processing, and can be accessed from various programs included in the management computers 3000 and 4000 via the management network 6000 using an API provided by the host computer 1000.

The virtual port management table T9000 includes: the column PORT WWN T9010 that registers the WWN of an HBA 1200; the column PORT WWN T9020 that registers the WWN of a virtual port 1210 created from the HBA 1200; the column VM ID T9030 that registers the identifier of the VM 1900 to which the virtual port 1210 is assigned; and the column AG ID T9040 that registers the identifier of an AG 7000 to which the VM 1900 belongs.

The assignment of a virtual port 1210 is executed by a VM administrator using the user interface of a virtual machine management program 1210 provided from an input unit 1700 and an output unit 1600, and the virtual machine management program 1210 registers information based on the relevant instruction in the virtual port 1210.

FIG. 25 is a diagram showing examples of configurations of host group management tables U1000 included in a logical port 2110 of the storage device 2000. A host group management table U1000 is referred to when the configuration control unit included in the storage device 2000 performs host group configuration change processing and logical path control processing and when an I/O control unit included in the storage device performs access control processing, and can be accessed from the management computer 3000 that is connected to the management network 6000 using a management API provided by a storage management server 2500 on the storage device 2000.

The host group management table U1000 includes: the column PORT ID U1010 that registers the identifier of a logical port 1210; the column PORT WWN U1020 that registers the WWN of the relevant logical port 1210; the column HG U1030 that registers the identifiers of HGs 2130 belonging to the relevant logical port 1210; the column INITIATOR WWN U1040 that registers the WWNs of Initiator Ports registered in the relevant HGs 2130; the column AG ID U1050 that registers the identifiers of AGs 7000 corresponding to the relevant HGs 2130; the column LUN T1060 that registers the identifiers of LUNs belonging to the relevant HGs 2130; and the column LDEV ID U1070 that registers the identifiers of LDEVs that are the substances of the relevant LUNs.

Figure 26:
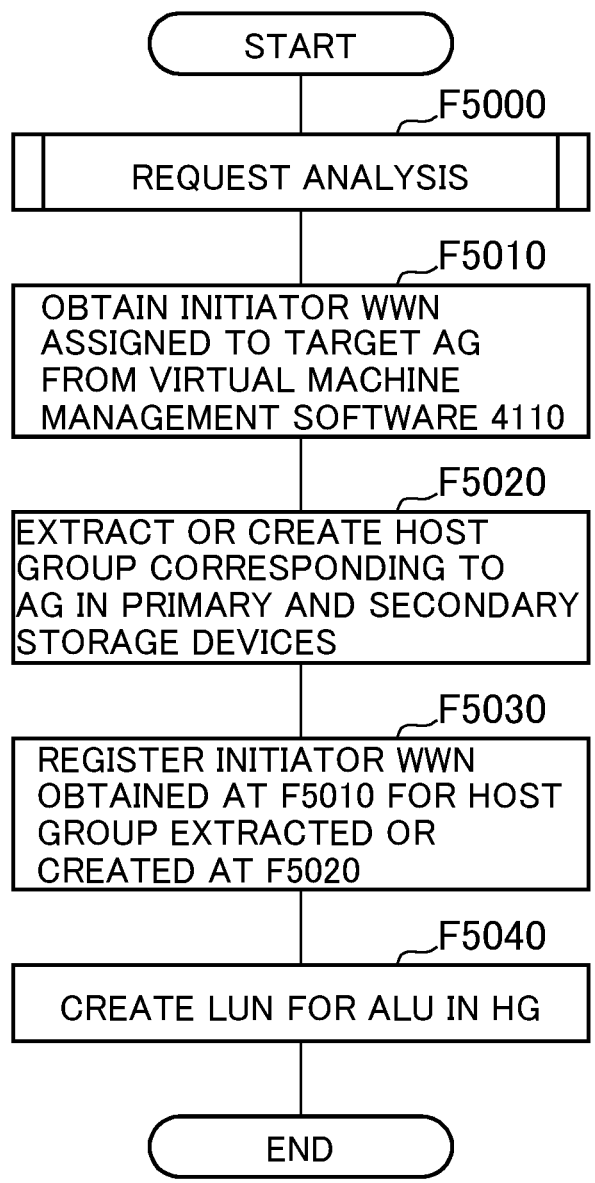
FIG. 26 is a diagram showing an example of a flowchart of LUN creation in a storage device management program.

FIG. 26 is a diagram showing an example of a configuration of a flowchart of Initiator Port WWN registration processing in which the WWN of an Initiator Port is registered in a HG 2130. This processing is started when a storage manager requests the configuration control unit of the storage device 2000 to perform this processing via a management user interface provided by storage management software 3110 or by the storage management server 2500.

In the above-mentioned WWN registration processing, the configuration control unit extracts the identifier of an AG 7000 from request information (at step F5000), and obtains the WWN of a virtual port 1210 assigned to the AG 7000 at step F5000 from a virtual machine management software 4110 of the management computer 4000 that is connected to the configuration control unit via the management network 6000 (at step F5010). The configuration control unit extracts an HG 2130 in which the AG 7000 the identifier of which is extracted at step F5000 is registered with reference to the host group management table U1000 (at step F5020), registers the WWN obtained at step F5010 for the extracted HG 2130 in the relevant column U1040 of the host group management table U1000 (at step F5030), and assigns an ALU 2120 to the HG 2310 extracted at step F5020.

If there is no relevant HG 2130 at step F5020, the configuration control unit newly creates an HG 2130 in one logical port 1210 that has already been physically connected to the SAN 5000, and registers the identifier of the AG 7000 extracted at step F5000 in the column U1050 of the newly created HG 2130.

At step F5020, in the case where the AG 7000 is extracted at step F5000, because "HA" is specified in the profiles of VMs 1900 belonging to the relevant AG 7000, only ALUs 2120 that are given HA attribute are assigned to the relevant HG 2130, and further in the case where ALUs 2120 are registered in an HG 2120, which corresponds to the relevant HG 2120 in this processing, in the counterpart storage device 2000 of the storage cluster, ALUs 2120, the identifiers of the virtual resources of which are the same as those of the ALUs assigned at step S020, are assigned.

Figure 27:
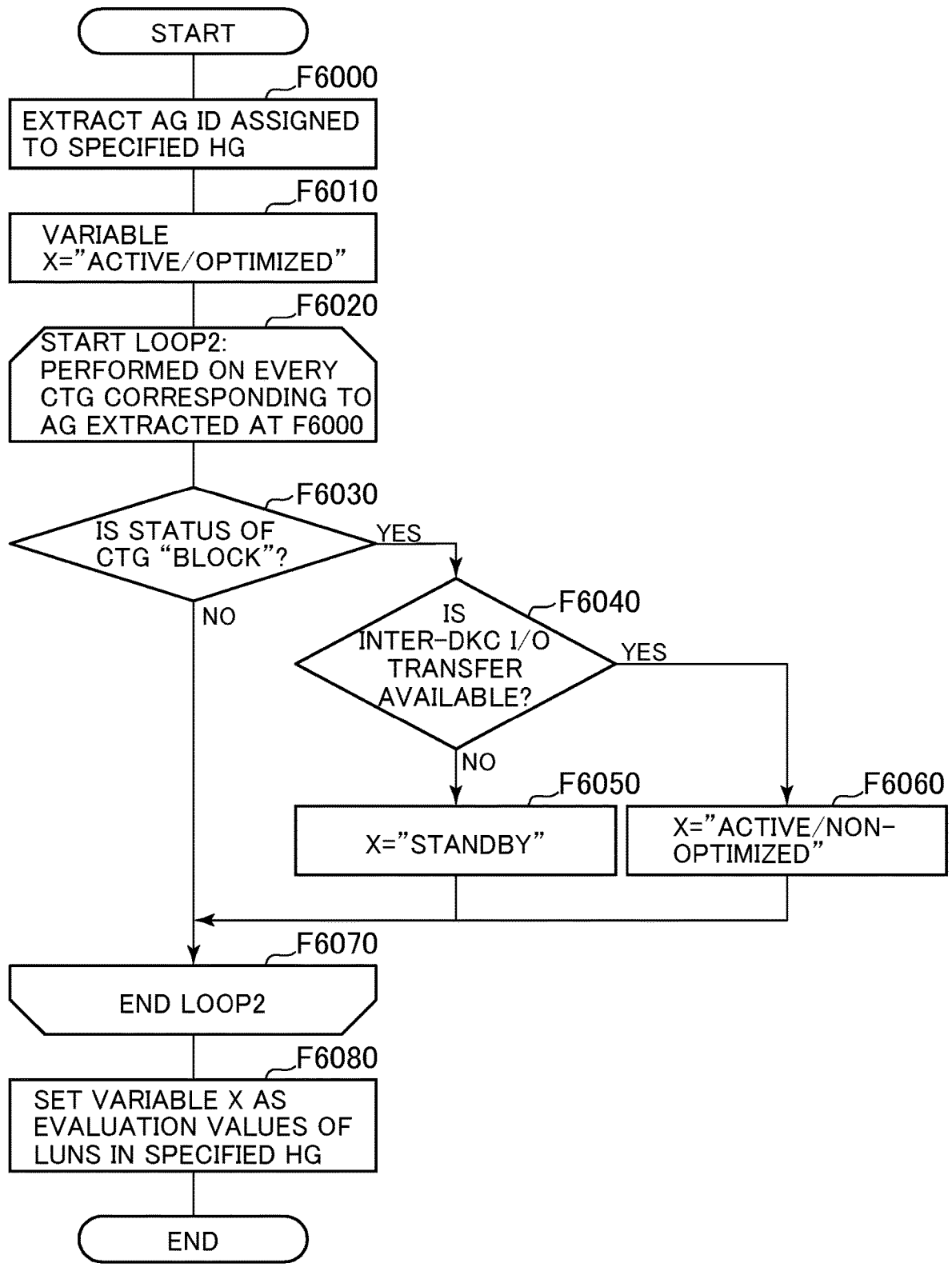
FIG. 27 is a diagram showing an example of a flowchart of logical bath evaluation processing included in the storage device.

FIG. 27 is a diagram showing an example of a configuration of a flowchart of logical bath evaluation processing per HG 2130 in the configuration control unit included in the storage device 2000 according to this embodiment. As is the case with the first embodiment or the second embodiment, this processing is performed when an SLU 2400 is bound to an ALU 2120 or unbound from an ALU 2120, or when the reduplication status of an SLU 2400 is changed. This processing is performed instead of the processing of the first embodiment shown in FIG. 19.

First, the configuration control unit extracts an HG 2310, to which an ALU 2120 regarding the occurrence of binding or unbinding belongs, and the identifier of an AG 7000, to which the HG 2310 belongs, are extracted (at step F6000), and "ACTIVE/OPTIMIZED" is set as the initial value of the evaluation value of the relative logical path (at step F6010).

The configuration control unit performs a loop processing shown at step F6020 on all the CTG 250 belonging to the AG 7000 extracted at step F6000. In the loop processing, the configuration control unit checks the status of a selected CTG 2500 (at step F6030), and if the status is "BLOCK", the configuration control unit checks whether an inter-storage device I/O transfer is available or not (at step F 6040). If the inter-storage device I/O transfer is available, the evaluation value X is set to "ACTIVE/OPTIMIZED" (at step F6060), and if not, the evaluation value X is set to "STANDBY" (at step F6050).

Next, after the loop processing at step F6020 is finished, the configuration control unit sets the evaluation values of all LUNs belonging to the HG 2310 extracted at step F6000 in the column T4040 of T4000 to the evaluation value X with reference to the LUN management table T4000 (at step F6080), and finishes this processing.

The above-described processing makes it possible to set the evaluation value of the logical path of an ALU 2310 per HG 2310, that is to say, per VM that uses an Initiator Port having its WWN in the HG 2310.

Fourth Embodiment

This embodiment relates to blockage processing for Conglomerate LUN Structure in the host computer 1000, and a storage system including logical path control, in which, even in the case where retries are executed regarding the logical path of an ALU 2120, and the predefined number of the retries occur, the logical path is not immediately blocked, but the statuses of SLUs 2400 bound to the relevant ALU 2120 are checked, and if there is an SLU 2400 that can receive an I/O, the relevant logical path is set to "ACTIVE/NON-OPTIMIZED", will be explained.

The configuration of the host computer 1000 according to this embodiment is the same as that shown in FIG. 3 or that shown in FIG. 4.

Figure 28:
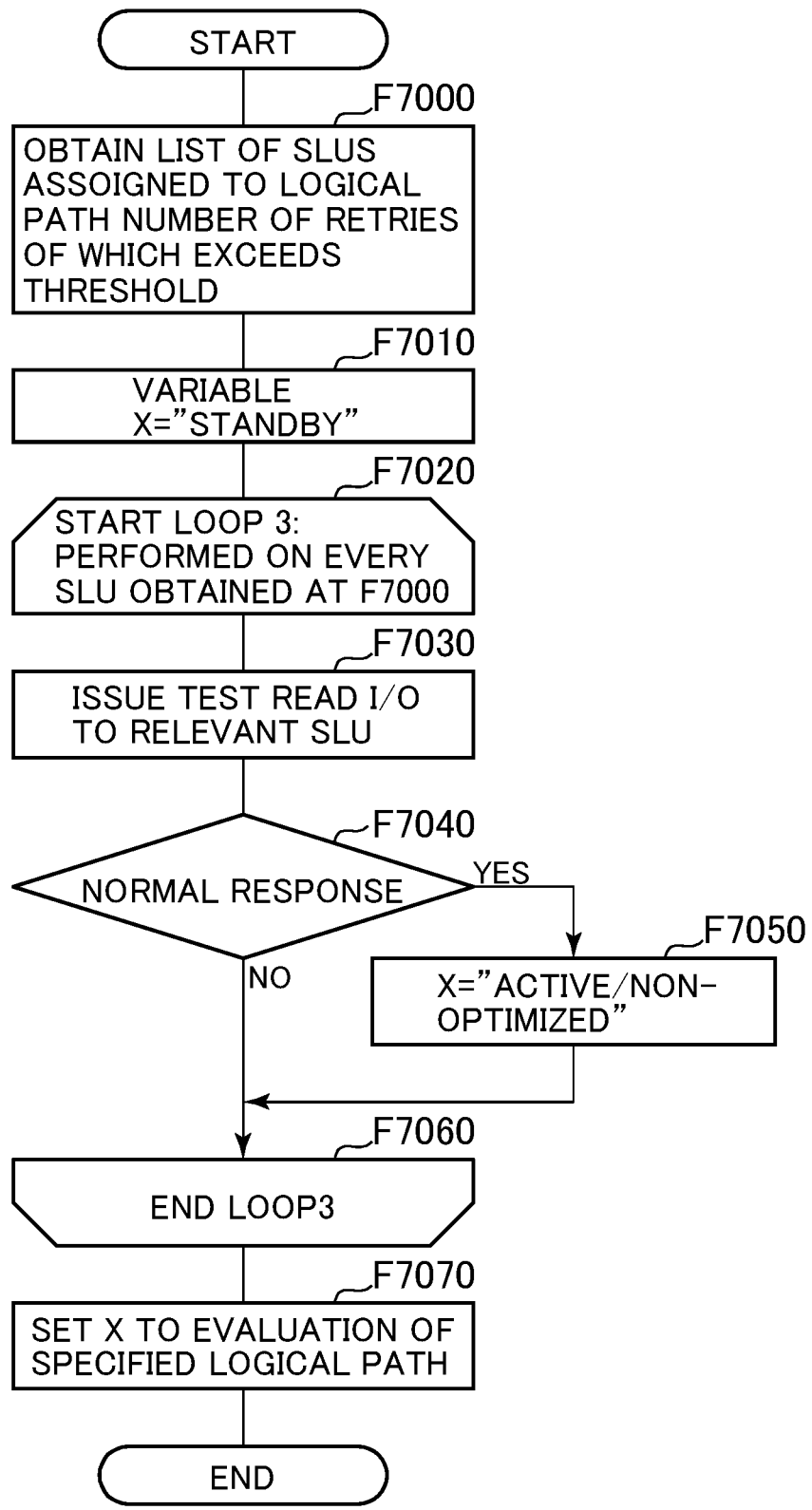
FIG. 28 is a diagram showing an example of a flowchart of logical bath evaluation processing included in the host computer.

FIG. 28 is a diagram showing an example of a configuration of a flowchart of logical bath evaluation processing performed in I/O processing, especially in I/O retry processing by the hypervisor 1230. This processing is performed when the number of retries regarding the logical path to an ALU 2120 exceeds a threshold that is predefined by a VM administrator.

In this processing, the configuration control unit or the hypervisor 1230 extracts SLUs 2400 bound to an ALU 2120 assigned to a logical path the number of retries regarding which exceeds the threshold with reference to the logical path management table T2000 and the bound management table T3000 (at step F7000), sets the initial value of the evaluation value of the logical path to "STANDBY" (at step F7010), and performs loop processing at step F7020 on all SLUs 2400 obtained at step F7000 (at step F7020). In this loop processing, the disk control 1232 issues a disk read I/O to the relevant SLU 2400, the alternate path control unit 1233 issues an I/O to the ALU 2120 via the relevant logical path (at step F7030), and if a normal response is obtained, the evaluation value is set to "ACTIVE/NON-OPTIMIZED" (at step F7050). When the above loop processing is finished, X is set to the evaluation value of the specified logical path (at step F7070).

With the above-described processing, if an ALU 2120 assigned to a logical path the number of retries regarding which exceeds the threshold includes only one SLU 2400 capable of performing I/O processing, it becomes possible that the relevant logical path is not blocked but it is set as a non-recommendable logical path in preparation for the issuance of an I/O to the SLU 2400.

LIST OF REFERENCE SIGNS

1000 . . . Host Computer, 2000 . . . Storage Device, 3000 . . . Management Computer, 4000 . . . Management Computer, 5000 . . . Storage Area Network, 6000 . . . Management Network, T1000 . . . Virtual Server Management Table, T2000 . . . Logical Path Management Table, T3000 . . . Bound Management Table, T4000 . . . LUN Management Table, T5000 . . . Logical Volume Management Table, T6000 . . . Consistency Group Management Table, T7000 . . . Bound Management Table, T8000 . . . Consistency Group Management Table, T9000 . . . Virtual Port Management Table, U1000 . . . Host Group Management Table, S1000 . . . Virtual Server Creation Processing, S2000 . . . Logical Resource Operation Processing, F1000 . . . Logical Resource Creation Processing, F2000 . . . Binding Processing, F3000 . . . Unbinding Processing, F4000 . . . Bound Group Assignment Processing, F5000 . . . ALU Assignment Processing, F6000 . . . Logical Path Evaluation Processing, F7000 . . . Logical Path Evaluation Processing

The invention claimed is:

1. An information processing system that is connected to one or a plurality of hosts and a second information processing system, which manages a second ALU (Administrative Logical Unit) connected to the one or plurality of hosts via a second logical path, and a plurality of second SLUs (Subsidiary Logical Units) for receiving I/O (Input/Output) requests from the one or plurality of hosts via the second logical path, and that includes a processor, wherein
the processor manages a first ALU connected to the one or plurality of hosts via a first logical path and a plurality of first SLUs that receive I/O requests from the one or plurality of hosts via the first logical path and a third SLU, and builds up a first group including the plurality of first SLUs,
at least one first SLU of the plurality of first SLUs and at least one second SLU of the plurality of second SLUs compose an HA (High Availability) pair, and the HA pair is provided to the one or plurality of hosts as one volume,
the processor builds up a second group including the plurality of third SLUs,
at least one third SLU of the plurality of third SLUs and at least one second SLU of the plurality of second SLUs compose an HA pair, and the HA pair is provided to the one or plurality of hosts as one volume, and
the processor
evaluates the state of the first logical path on the basis of the pair state of the plurality of first SLUs that compose the HA pair included in the first group so that priorities with which the one or plurality of hosts issue I/Os to the first logical path can be determined, and
determines first priority that the one or plurality of hosts issue I/O to the first SLU via the first logical path, evaluates the state of the first logical path based on the pair state of the plurality of third SLUs that compose the HA pair included in the second group, and determines second priority that the one or plurality of hosts issue I/O to the third SLU via the first logical path.

2. The information processing system according to claim 1, wherein, if the pair state of the first SLU that composes the HA pair included in the first group does not include "BLOCK", the processor evaluates the state of the first logical path as "ACTIVE/OPTIMIZED";
if the pair state of the first SLU that composes the HA pair included in the first group includes "BLOCK", and an I/O transfer between the information processing system and the second information processing system is utilizable, the processor evaluates the state of the first logical path as "ACTIVE/NON-OPTIMIZED";
if the pair state of the first SLU that composes the HA pair included in the first group includes "BLOCK", and an I/O transfer between the information processing system and the second information processing system is not utilizable, the processor evaluates the state of the first logical path as "STANDBY";
if the pair state of the logical volume includes "BLOCK", I/O is impossible for the logical volume;
if in the state of "ACTIVE/OPTIMIZED", I/O is issued preferentially to the logical path; and
if I/O processing is possible but there was a probability of try request, "ACTIVE/OPTIMIZED" is defined.

3. The information processing system according to claim 1, wherein the processor evaluates the state of the first logical path when any of the plurality of first SLUs is bound to the first ALU or when any of the plurality of first SLUs is unbound from the first ALU.

4. The information processing system according to claim 1, the information processing system further comprising the one or plurality of hosts, wherein the one or plurality of hosts issue I/Os to the one volume via the first logical path or the second logical path on the basis of the evaluation of the state of the first logical path.

5. The information processing system according to claim 1, wherein
the one or plurality of hosts manage as a first AG (Availability Group) including a plurality of first virtual computers, and manage as a second AG including a plurality of second virtual computers,
the first group further includes the first ALU, and
the first AG is associated with the first group, and one or a plurality of SLUs out of the plurality of first SLUs are assigned to the plurality of first virtual computers.

6. The information processing system according to claim 1, wherein
the one or plurality of hosts manage as a first AG (Availability Group) including a plurality of first virtual computers,
the processor manages the identifier of a virtual port assigned to the first AG, which the host has, as a first HG (Host Group),
associates the first group with the first AG, and
evaluates the state of the first HG pair on the basis of the pair state of the first SLU that composes the HA pair included in the first group so that priorities with which the plurality of first virtual computers issue I/Os to the first logical path can be determined.

7. An information processing system that is connected to one or a plurality of hosts and a second information processing system, which manages a second ALU (Administrative Logical Unit) connected to the one or plurality of hosts via a second logical path, and a plurality of second SLUs (Subsidiary Logical Units) for receiving I/O (Input/Output) requests from the one or plurality of hosts via the second logical path, and that includes a processor, wherein,
the processor manages a first ALU connected to the one or plurality of hosts via a first logical path and a plurality of first SLUs that receive I/O requests from the one or plurality of hosts via the first logical path, and builds up a first group including the plurality of first SLUs, at least one first SLU of the plurality of first SLUs and at least one second SLU of the plurality of second SLUs compose an HA (High Availability) pair, and the HA pair is provided to the one or plurality of hosts as one volume, and the processor evaluates the state of the first logical path on the basis of the pair state of the first SLU that composes the HA pair included in the first group so that priorities with which the one or plurality of hosts issue I/Os to the first logical path can be determined, when the number of retries of I/O issuance to the first logical path exceeds a threshold, the processor issues a test I/O to the plurality of first SLUs, and when
the processor receives at least one normal response from one or more first SLUs of the plurality of first SLUs, the processor evaluates the state of the first logical path as "ACTIVE/NON-OPTRIMIZED", and the processor does not receive a normal response from any first SLU of the plurality of first SLUs, the processor evaluates the state of the first logical path as "BLOCK".

8. A control method of an information processing system that is connected to one or a plurality of hosts and a second information processing system, which manages a second ALU (Administrative Logical Unit) connected to the one or plurality of hosts via a second logical path, and a plurality of second SLUs (Subsidiary Logical Units) for receiving I/O (Input/Output) requests from the one or plurality of hosts via the second logical path, and that includes a processor, wherein the processor manages a first ALU connected to the one or plurality of hosts via a first logical path and a plurality of first SLUs that receive I/O requests from the one or plurality of hosts via the first logical path and a third SLU, and builds up a first group including the plurality of first SLUs, an HA (High Availability) pair is composed of at least one first SLU of the plurality of first SLUs and at least one second SLU of the plurality of second SLUs, and the HA pair is provided to the one or plurality of hosts as one volume, and the processor builds up a second group including the plurality of third SLUs, at least one third SLU of the plurality of third SLUs and at least one second SLU of the plurality of second SLUs compose an HA pair, and the HA pair is provided to the one or plurality of hosts as one volume, and the processor
evaluates the state of the first logical path on the basis of the pair state of the first SLU that composes the HA pair included in the first group so that priorities with which the one or plurality of hosts issue I/Os to the first logical path can be determined, and determines first priority that the one or plurality of hosts issue I/O to the first SLU via the first logical path, evaluates the state of the first logical path based on the pair state of the plurality of third SLUs that compose the HA pair included in the second group, and determines second priority that the one or plurality of hosts issue I/O to the third SLU via the first logical path.

9. The control method of the information processing system according to claim 8, wherein, if the pair state of the first SLU that composes the HA pair included in the first group does not include "BLOCK", the state of the first logical path is evaluated as "ACTIVE/OPTIMIZED";

if the pair state of the first SLU that composes the HA pair included in the first group includes "BLOCK", and an I/O transfer between the information processing system and the second information processing device system is utilizable, the state of the first logical path is evaluated as "ACTIVE/NON-OPTIMIZED";

if the pair state of the first SLU that composes the HA pair included in the first group includes "BLOCK", and an I/O transfer between the information processing system and the second information processing system is not utilizable, the state of the first logical path is evaluated as "STANDBY";

if the pair state of the logical volume includes "BLOCK", I/O is impossible for the logical volume;

if in the state of "ACTIVE/OPTIMIZED", I/O is issued preferentially to the logical path; and if I/O processing is possible but there was a probability of try request, "ACTIVE/OPTIMIZED" is defined.

10. The control method of the information processing system according to claim 8, wherein the information processing system further includes the one or plurality of hosts; and the one or plurality of hosts issues I/Os to the one volume via the first logical path or the second logical path on the basis of the evaluation of the state of the first logical path.

* * * * *